(12) United States Patent
Kunimatsu et al.

(10) Patent No.: US 7,103,274 B2
(45) Date of Patent: Sep. 5, 2006

(54) CROSS-CONNECT APPARATUS

(75) Inventors: Kazuhiro Kunimatsu, Kawasaki (JP); Hiroya Egoshi, Kawasaki (JP); Akio Takayasu, Kawasaki (JP); Yukiko Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 10/634,394

(22) Filed: Aug. 5, 2003

(65) Prior Publication Data

US 2004/0090236 A1  May 13, 2004

Related U.S. Application Data

(63) Continuation of application No. PCT/JP01/00839, filed on Feb. 7, 2001.

(51) Int. Cl.
| | |
|---|---|
| *G02F 1/00* | (2006.01) |
| *H04B 10/08* | (2006.01) |
| *H04B 17/02* | (2006.01) |
| *H04B 3/46* | (2006.01) |
| *H03K 17/76* | (2006.01) |

(52) U.S. Cl. .............................. 398/2; 398/12; 398/19; 398/45; 398/48; 398/50; 398/51; 398/55; 398/56; 370/219; 370/220; 307/407; 307/408; 307/409; 307/410; 307/411; 361/778

(58) Field of Classification Search ............... 398/2, 398/12, 19, 45, 48, 50, 51, 55, 56
See application file for complete search history.

(56) References Cited

U.S. PATENT DOCUMENTS

| | | | |
|---|---|---|---|
| 5,040,170 A | * | 8/1991 | Upp et al. ..................... 398/50 |
| 5,193,087 A | * | 3/1993 | Lichtash et al. ............. 370/360 |
| 5,218,465 A | * | 6/1993 | Lebby et al. .................. 398/19 |
| 5,754,320 A | * | 5/1998 | Watanabe et al. ............. 398/50 |
| 5,859,776 A | * | 1/1999 | Sato et al. ................... 700/121 |
| 5,937,117 A | * | 8/1999 | Ishida et al. .................. 385/24 |
| 6,441,935 B1 | * | 8/2002 | Araki et al. ................... 398/52 |
| 6,829,436 B1 | * | 12/2004 | Koh et al. ..................... 398/56 |

FOREIGN PATENT DOCUMENTS

| | | |
|---|---|---|
| JP | 9-46735 | 2/1997 |
| JP | 9-238370 | 9/1997 |
| JP | 10-210511 | 8/1998 |
| JP | 10-257580 | 9/1998 |

* cited by examiner

*Primary Examiner*—Kenneth Vanderpuye
*Assistant Examiner*—Danny Wai Lun Leung
(74) *Attorney, Agent, or Firm*—Katten Muchin Rosenman LLP

(57) ABSTRACT

An apparatus having n-number of working cross-connects for cross-connecting an n-bit input signals arriving from a plurality of input paths on a per-bit basis; n-number of first logic circuits for calculating the exclusive-ORs of each said n-bit and applying outputs to a standby cross-connect for providing outputs; n-number of second logic circuits for calculating the exclusive-ORs of said output signals from each of said working cross-connects and from the single standby cross-connect; and third logic circuits for selecting output signals of said working cross-connects and outputs of the second logic circuits. The apparatus detects the occurrence of an abnormality in working cross-connects by monitoring the outputs of the second logic circuits, identifies the faulty cross-connect by successively turning off one of the n-inputs to the first and second logic circuits, and select outputs from the second logic circuits instead of from the faulty cross-connect by using the third logic circuits.

9 Claims, 14 Drawing Sheets

FIG. 3

(a) WHEN OPERATION IS NORMAL

| | NUMBER OF "1"s ON ith CHANNEL | OUTPUT OF LOGIC CIRCUIT $205_i$ | NUMBER OF jth OUTPUTS OF ALL CROSS-CONNECTS THAT ARE "1"s | OUTPUT OF LOGIC CIRCUIT $211_j$ |
|---|---|---|---|---|
| ① | ODD | "1" | ODD | "0" |
| ② | EVEN | "0" | EVEN | "0" |

(b) WHEN MALFUNCTION OCCURS

| | NUMBER OF "1"s ON ith CHANNEL | OUTPUT OF LOGIC CIRCUIT $205_i$ | NUMBER OF jth OUTPUTS OF ALL CROSS-CONNECTS THAT ARE "1"s | OUTPUT OF LOGIC CIRCUIT $211_j$ |
|---|---|---|---|---|
| ③ | ODD | "1" | ODD | "0" |
| ④ | EVEN | "0" | EVEN | "0" |

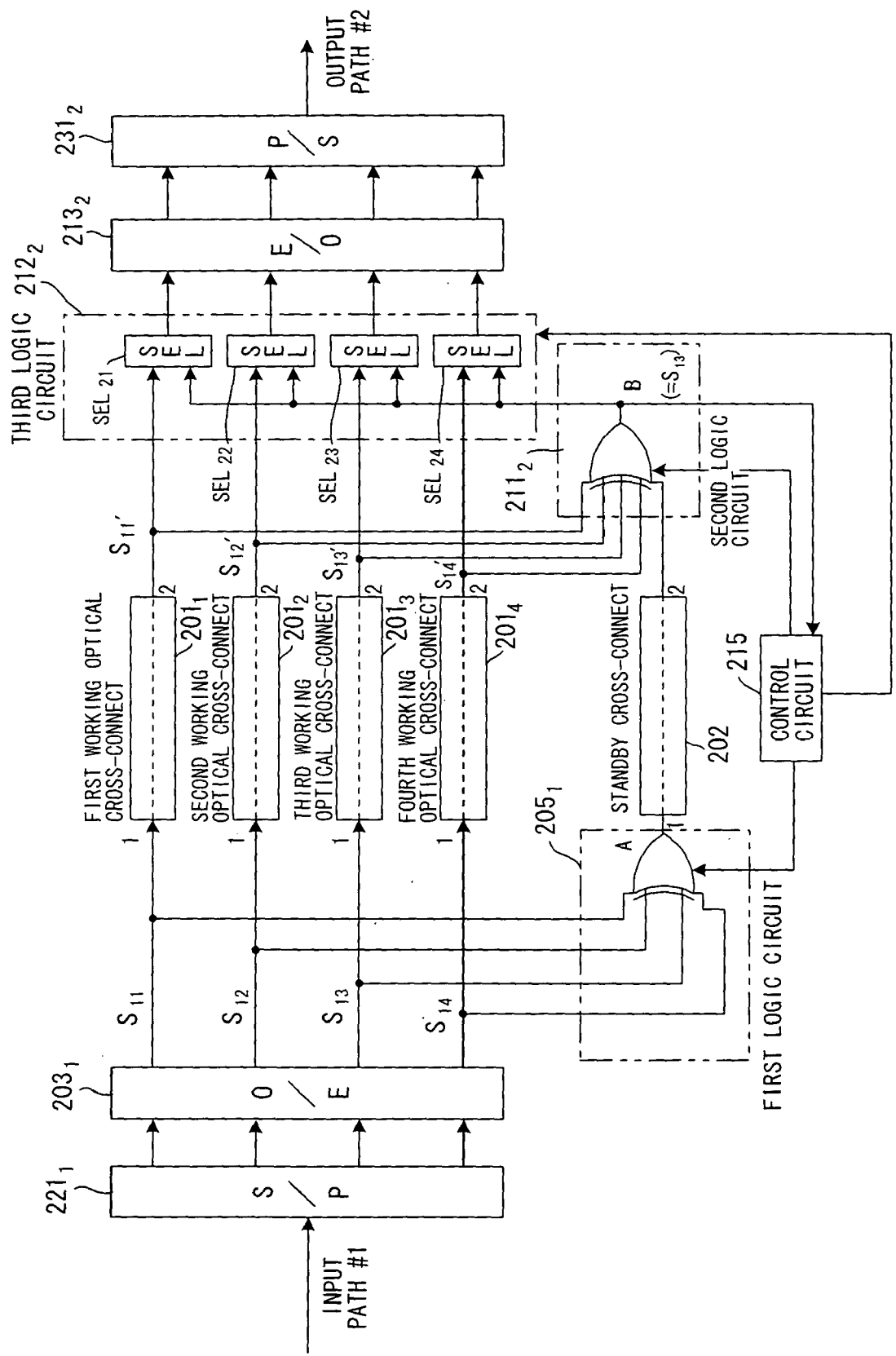

CROSS-CONNECT APPARATUS

CROSS-REFERENCE TO RELATED APPLICATION

The present application is a continuation of International Application No. PCT/JP01/00839 which was filed on Feb. 7, 2001.

BACKGROUND OF THE INVENTION

This invention relates to a cross-connect apparatus having a plurality of cross-connects. More particularly, the invention relates to a cross-connect apparatus which, while reducing the burden of control performed by a controller, is capable of detecting cross-connect abnormality, detecting the cross-connect in which the abnormality has occurred, switching over to a standby cross-connect and switching back to a working cross-connect at the time of recovery.

It is believed that the interfacing of optical signals to optical transmission devices will undergo a shift in emphasis from the handling of serial signals to the handling of parallel signals in the future. The present invention furnishes a cross-connect apparatus, the input to which is an optical parallel signal, with a highly reliable redundant structure and the ability to detect errors within the apparatus at minimum cost.

Structure of Cross-Connect Apparatus According to Prior Art

FIG. 13 is a diagram illustrating the structure of an optical cross-connect apparatus according to the prior art. If m(=4) represents the number of input paths and n(=4) represents the number of bits of each channel arriving in time-shared fashion from each input path, then n-number of m×m working optical cross-connects $101_1$ to $101_n$ are provided and one standby optical cross-connect 102 is provided for the n-number of working cross-connects. As Illustrated in FIG. 14, an m×m cross-connect has m-number of input terminals and m-number of output terminals (where m=4 holds in the Figure), m-number of input lines and m-number of output lines are arrayed to intersect in the form of a matrix, and a switch is provided at each intersection. In order to implement a cross connection in such a manner that a signal that has arrived at an ith input terminal will be output from a jth output terminal, the switch at the intersection (i,j) is turned on (see the black circles). The Figure illustrates a case where a first input signal is cross-connected to a fourth output, a second input signal to a first output, a third input signal to a third output and a fourth input signal to a second output. It should be noted that although signals on a plurality of channels arrive in time-shared fashion from a single input path, each channel that arrives from an input path #i shall be referred to as an ith channel for the sake of explanation.

Optical signals of first to fourth channels that arrive from optical input paths #1 to #4 are input to optoelectronic transducers (O/E) $103_1$ to $103_4$, respectively, upon being converted to n(=4)-bit parallel signals by serial/parallel converters, which are not shown. The optoelectronic transducers $103_1$ to $103_4$ convert the optical signals that enter from each of the input paths to electrical signals. A distributor 105i (i=1 to 4) inputs the first to fourth bit signals of a channel i that arrives from input path #i to ith input terminals of respective ones of the first to fourth cross-connects $101_1$ to $101_4$ and to a selector 106.

By way of example, the distributor $105_1$ inputs the first to fourth bit signals of the first channel that arrives from input path #1 to the first input terminals of respective ones of the first to fourth cross-connects $101_1$ to $101_4$ and to the selector 106. Similarly, the distributor $105_2$ inputs the first to fourth bit signals of the second channel that arrives from input path #2 to the second input terminals of respective ones of the first to fourth cross-connects $101_1$ to $101_4$ and to the selector 106. If an abnormality occurs in the ith optical cross-connect $101_i$, the selector 106 selects the ith bit signals of the first to fourth channels that enter the ith optical cross-connect $101_i$ and inputs these to the standby optical cross-connect 102.

Electro-optic transducers (E/O) $107_1$ to $107_4$, 108 are provided on the input side of the working and standby optical cross-connects $101_1$ to $101_4$, 102, respectively, and optoelectronic transducers (O/E) $109_1$ to $109_4$, 110 are provided on the output side of these cross-connects. Signals sent from the first output terminals of the first to fourth cross-connects $101_1$ to $101_4$ are converted to electrical signals by the optoelectronic transducers $109_1$ to $109_4$, and the electrical signals are input to an electro-optic transducer $104_1$ via a selector $111_1$. Similarly, signals sent from the second output terminals of the first to fourth cross-connects $101_1$ to $101_4$ are converted to electrical signals by the optoelectronic transducers $109_1$ to $109_4$, and the electrical signals are input to an electro-optic transducer $104_2$ via a selector $111_2$. Signals sent from the third output terminals of the first to fourth cross-connects $101_1$ to $101_4$ are converted to electrical signals by the optoelectronic transducers $109_1$ to $109_4$, and the electrical signals are input to an electro-optic transducer $104_3$ via a selector $111_3$. Signals sent from the fourth output terminals of the first to fourth cross-connects $101_1$ to $101_4$ are converted to electrical signals by the optoelectronic transducers $109_1$ to $109_4$, and the electrical signals are input to an electro-optic transducer $104_4$ via a selector $111_4$. The electro-optic transducers $104_1$ to $104_4$ convert the cross-connected electrical parallel signals input thereto to optical parallel signals and input these parallel signals to parallel/serial converters (not shown). The parallel/serial converters convert the optical parallel signals to optical serial signals and send these signals to prescribed optical output paths #1 to #4.

The first to fourth optical signals of the standby optical cross-connect 102 are converted to electro-optic signals by the optical electro-optic transducer 110, and these signals are input to a distributor 112. If an abnormality occurs in an ith optical cross-connect $101_i$, the distributor 112 inputs the first output signal of the standby optical cross-connect 102 to an ith terminal on the standby side of the selector $111_1$, inputs the second output signal of the standby optical cross-connect 102 to the ith terminal on the standby side of the selector $111_2$, inputs the third output signal of the standby optical cross-connect 102 to the ith terminal on the standby side of the selector $111_3$, and inputs the fourth output signal of the standby optical cross-connect 102 to the ith terminal on the standby side of the selector $111_4$. When operation is normal, the selectors $111_1$ to $111_4$ select parallel signals of four bits input to the four input terminals of the working channels and input these signals to the electro-optic transducers $104_1$ to $104_4$, which constitute the next stage. If an abnormality occurs in the ith cross-connect $101_i$, however, the selectors $111_1$ to $111_4$ select a four-bit signal that is the result of replacing the signals input to the ith input terminals on the working side by signals input to the ith input terminals on the standby side.

A signal cut-off detecting circuit 113 detects cut-off of the signal output from each output terminal of the working optical cross-connects $101_1$ to $101_4$, thereby detecting an abnormality in a working cross-connect, and proceeds to notify a controller 115 of the result of detection. A signal cut-off detecting circuit 114 detects cut-off of signals output from the distributor 112, thereby detecting an abnormality in the standby optical cross-connect 102, and proceeds to notify the controller 115 of the result of detection.

Operation

Assume that signals on the first channel that enters from the input path #1 are output upon being cross-connected to the output path #2. As indicated by the dashed lines in FIG. 15, the working optical cross-connects $101_1$ to $101_4$ each cross-connect the first input to the second output. Further, the standby optical cross-connect 102 also cross-connects the first input to the second output. Operation is similar with regard to the other input paths as well. Generally, if a signal on an ith channel that arrives from input path #i is output upon being cross-connected to an output path #j, the working optical cross-connects $101_1$ to $101_4$ and the standby optical cross-connect 102 each cross-connect the ith input to the jth output.

If the signal cut-off detecting circuit 113 detects cut-off of the signal from, e.g., the working optical cross-connect $101_1$ in a state in which a signal on the first channel that is input from the input path #1 is cross-connected to the output path #2, then the signal cut-off detecting circuit 113 notifies the controller 115 of result of detection. The controller 115 controls the selector 106, which, as indicated by the dashed lines, selects the first bit signals of the first to fourth channels that are input to the working optical cross-connect $101_1$ and inputs these signals to the four input terminals of the standby optical cross-connect 102. As a result, the standby optical cross-connect 102 attains an input state identical with that of the working optical cross-connect $101_1$.

Further, the controller 115 controls the distributor 112 so that the four output signals of the standby optical cross-connect 102 are input to the first input terminals on the standby side of respective ones of the selectors $111_1$ to $111_4$ that are the same as those that receive the four output signals of the working optical cross-connect $101_1$. Furthermore, the controller 115 instructs the selectors $111_1$ to $111_4$ to select the signal from the standby optical cross-connect 102 instead of the signal from the working optical cross-connect $101_1$ as the first bit. As a result, the selectors $111_1$ to $111_4$ select the signal from the standby optical cross-connect 102 as the first bit and select the signals from the working optical cross-connects $101_2$ to $101_4$ as the second to fourth bits.

By virtue of the foregoing, rescue is possible and cross-connect control can continue even if the working optical cross-connect $101_1$ develops an abnormality. Similarly, rescue is possible if an abnormality should occur in the other working optical cross-connects $101_2$ to $101_4$. If the working optical cross-connect that malfunctioned returns to normal after the changeover is made to the standby optical cross-connect 102, then the original normal state is restored and cross-connect control continues.

Problems

With the conventional optical cross-connect system, it is necessary to control the two selectors, namely the selector 106 on the input side and the selectors $111_1$ to $111_4$ on the output side, simultaneously even though changeover of the signal to the standby optical cross-connect 102 is performed when a malfunction occurs. As a consequence, there is an increase in the number of optical parallel signals and an increase in the number of optical cross-connects, resulting in an apparatus of large size. A problem which arises is that there is an increase in load with regard to selector control.

Further, what can be detected by the signal cut-off detecting circuit 113 is only the fact that a signal has been cut off. A problem which results is that signals cannot be checked for error.

SUMMARY OF THE INVENTION

Accordingly, an object of the present invention is to so arrange it that an abnormality in a cross-connect apparatus can be detected by a simple arrangement of logic circuits.

Another object of the present invention is to so arrange it that the occurrence of abnormality in any working cross-connect can be detected by a simple arrangement of logic circuits.

Another object of the present invention is to so arrange it that changeover of working and standby optical cross-connects can be performed by a simple arrangement of logic circuits, thereby alleviating the control load involved in a working and standby changeover operation performed by a controller.

Another object of the present invention is to so arrange it that an abnormality can be detected not only at cut-off of a signal from a cross-connect but also in a case where a signal changes from "1" to "0" or from "0" to "1" in a cross-connect. A further object is to so arrange it that cross-connect control can be continued by changing over to a standby cross-connect when such an abnormality occurs.

The present invention discloses a cross-connect apparatus having first to nth cross-connects for changing over output paths of n-bit input signals that arrive from respective ones of m-number of input paths, and a connection architecture for inputting first to nth bit data of an input signal that arrives from an ith input path (i=1 to m) to respective ones of ith input terminals of the first to nth cross-connects and sending bit data that is output from jth output terminals (j=1 to m) of the first to nth cross-connects to a jth output path. The cross-connect apparatus comprises (1) m-number of first logic circuits for calculating the exclusive-OR of the first to nth bit data of input signals that arrives from an ith input path (i=1 to m); (2) a standby cross-connect having an ith terminal to which is input an output signal of a first logic circuit that corresponds to the ith input path (i=1 to m); (3) m-number of second logic circuits for calculating the exclusive-OR of signals output from the jth terminals (j=1 to m) of the first to nth working cross-connects and of the standby cross-connect; and (4) abnormality detecting means for detecting that an abnormality has occurred in any of the working cross-connects. When the working and standby cross-connects have all been set to the same cross-connect state, the abnormality detecting means monitors output signals from the second exclusive-OR circuits and, in response to generation of an output signal that differs from that when operation is normal, decides that an abnormality has occurred in any of the n-number of working cross-connects.

In accordance with the present invention, an abnormality in the cross-connect apparatus can be detected by a simple arrangement of logic circuits. Moreover, an abnormality can be detected in a case where a signal changes from "1" to "0" or from "0" to "1" in a working cross-connect.

The cross-connect apparatus of the present invention further comprises abnormal cross-connect specifying means for specifying, in a manner described below, whether an abnormality has occurred in any cross-connect when an abnormality has been detected. Specifically, first, without inputting signals that enter an ith (i=1) cross-connect to each of the first logic circuits and without inputting signals that are output from the ith cross-connect to each of the second logic circuits, the abnormal cross-connect specifying means monitors whether the output signals of the second logic circuits at this time are the same as when operation is normal. Thereafter, the abnormal cross-connect specifying means increments i successively, changes over the signals that are not input to each of the first and second logic circuits and decides that an abnormality has occurred in the ith cross-connect when the output signals of the second logic circuits become the same as when operation is normal. In accordance with the present invention, whether an abnormality has occurred in any of the working cross-connects can be detected by a simple arrangement of logic circuits.

Further, the cross-connect apparatus according to the present invention further comprises a controller for exercising control in such a manner that a signal output from an ith cross-connect will not be input to the second logic circuits when an abnormality has occurred in the ith cross-connect, and third logic circuits for replacing m-number of signals output from the ith cross-connect with output signals of m-number of the second logic circuits and outputting the latter signals. The output signals of the m-number of second logic circuits are the same as m-number of ith bit signals that enter from the input paths #1 to #4. In accordance with the present invention, changeover of working and standby cross-connects can be performed by a simple arrangement of logic circuits and the load involved in the working and standby changeover control can be alleviated.

Further, the cross-connect apparatus of the present invention comprises fourth logic circuits for checking whether output signals of the m-number of second logic circuits agree with m-number of signals output from an ith cross-connect in which an abnormality has been detected, and means for determining that the ith cross-connect has returned to normal in response to agreement of the signals that continues for a predetermined period of time. In accordance with the present invention, recovery can be detected by a simple arrangement of logic circuits and it is possible to switch back to a working cross-connect from the standby cross-connect unerringly.

BRIEF DESCRIPTION OF THE DRAWINGS

FIG. 3 is a diagram useful in describing outputs of a logic circuit in a case where an input path #i is cross-connected to an output path #j;

FIG. 4 is a diagram showing the main structure of a cross-connect apparatus in which only a portion that cross-connects an input path #i to an output path #j has been extracted for illustration;

DESCRIPTION OF THE PREFERRED EMBODIMENTS (A) Overall Structure of Cross-Connect Apparatus According to the Present Invention FIG. 1 is a diagram illustrating the overall structure of a cross-connect apparatus according to the present invention. If n(=4) represents the number of bits of each channel arriving in time-shared fashion from each input path, then n-number of m×m working optical cross-connects $101_1$ to $101_n$ are provided and one standby optical cross-connect 202 is provided for the n-number of working cross-connects. It should be noted that although signals on a plurality of channels arrive in time-shared fashion from a single input path, each channel that arrives from an input path #i shall be referred to as an ith channel for the sake of explanation.

Figure 1:
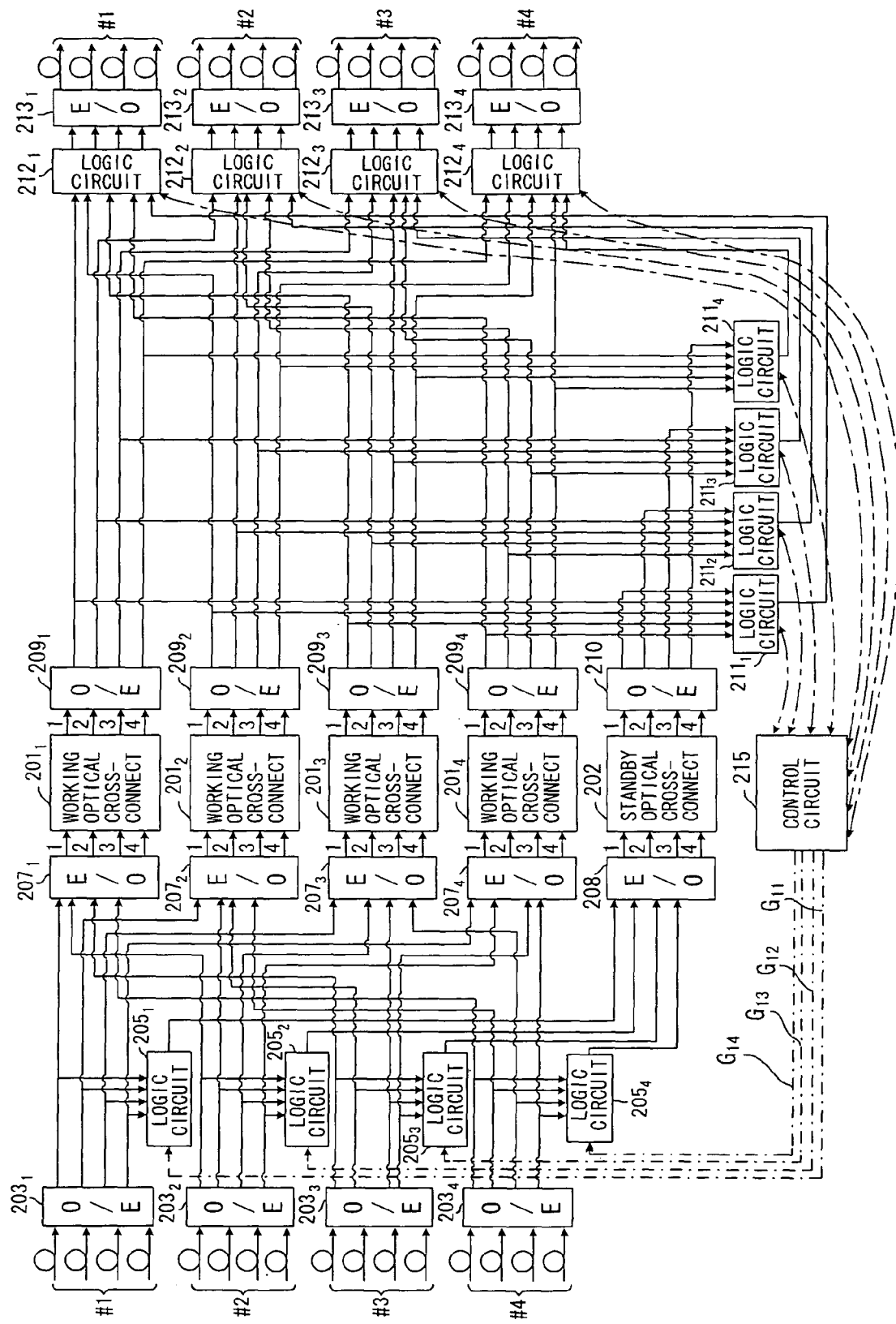
FIG. 1 is a diagram illustrating the overall structure of a cross-connect apparatus according to the present invention.

Optical signals of first to fourth channels that arrive from input paths #1 to #4 are input to optoelectronic transducers (O/E) $203_1$ to $203_4$, respectively, upon being converted to n(=4)-bit parallel signals by serial/parallel converters, which are not shown. The optoelectronic transducer $203_1$ inputs first to fourth bit signals of the first channel arriving from the first path to first input terminals of respective ones of the first to fourth optical cross-connects $201_1$ to $201_4$ and to a logic circuit $205_1$. Similarly, an optoelectronic transducer $203_i$ connected to an input path #i (i=1 to 4) inputs first to fourth bit signals of the ith channel arriving from the abovementioned path to ith input terminals of respective ones of the first to fourth optical cross-connects $201_1$ to $201_4$ and inputs the first to fourth bit signals to a first logic circuit $205_1$ (i=1 to 4), which calculates the exclusive-OR. The logic circuit $205_1$ calculates the exclusive-OR of the first to fourth bit signals of the ith channel and inputs the result of this operation to the standby cross-connect 202 via an electro-optic transducer.

Electro-optic transducers (E/O) $207_1$ to $207_4$, 208 are provided on the input side of the working and standby optical cross-connects $201_1$ to $201_4$, 202, respectively, and optoelectronic transducers (O/E) $209_1$ to $209_4$, 210 are provided on the output side of these cross-connects.

Signals sent from the first output terminals of the first to fourth cross-connects $201_1$ to $201_4$ are converted to electrical signals by the optoelectronic transducers $209_1$ to $209_4$, and the electrical signals are input to logic circuits $211_1$, and $212_1$ corresponding to output path #1. The logic circuit $211_1$ calculates the exclusive-OR of these input signals, and the logic circuit $212_2$ performs signal selection in accordance with the absence or presence of an abnormality. Similarly, signals sent from ith output terminals (i=1 to 4) of the first to fourth cross-connects $201_1$ to $201_4$ are converted to electrical signals by the optoelectronic transducers $209_1$ to $209_4$, and the electrical signals are input to logic circuits $211_i$ and $212_i$ corresponding to output path #i. The logic circuit $211_i$ calculates the exclusive-OR of these input signals, and the logic circuit $212_i$ performs signal selection in accordance with the absence or presence of an abnormality. The parallel signals of four bits selected by each of the logic circuits $212_1$ to $212_4$ are converted to optical parallel signals by electro-optic transducers $212_1$ to $213_4$, respectively, and the optical parallel signals are input to parallel/serial converters, not shown. The parallel/serial converters convert the entered optical parallel signals to optical serial signals and send these signals to prescribed optical output paths #1 to #4. The four signals output from first to fourth output terminals of the standby optical cross-connect 202 are converted to electrical signals by the optoelectronic transducer 210, and the electrical signals are input to the logic circuits $211_1$, to $211_4$.

As a result of the foregoing, five signals output from the first output terminals of the optical cross-connects $201_1$ to $201_4$ and of the standby optical cross-connect 202 are input to the logic circuit $211_1$, that corresponds to the output path #1. Further, five signals output from the second output terminals of the optical cross-connects $201_1$ to $201_4$ and of the standby optical cross-connect 202 are input to the logic circuit $211_2$ that corresponds to the output path #2. Further, five signals output from the third output terminals of the optical cross-connects $201_1$ to $201_4$ and of the standby optical cross-connect 202 are input to the logic circuit $211_3$ that corresponds to the output path #3. Further, five signals output from the fourth output terminals of the optical cross-connects $201_1$ to 201, and of the standby optical cross-connect 202 are input to the logic circuit $211_4$ that corresponds to the output path #4.

A controller 215 (1) monitors the output signals from the logic circuits $211_1$, to $211_4$ and detects any abnormality in the optical cross-connects; (2) changes over the input signals of the logic circuits $205_4$ to $205_4$ and of logic circuits $211_1$ to $211_4$ and monitors the output signals of the logic circuits $211_1$ to $211_4$ at this time to thereby specify whether an abnormality has occurred in any of the optical cross-connects; and (3) inputs changeover signals to the logic circuits $212_1$ to $212_4$ based upon whether an abnormality has occurred in any of the optical cross-connects, thereby outputting the correct signals.

(B) Abnormality Detection Control

When cross-connecting the working optical cross-connects $201_1$ to $201_4$ and standby optical cross-connect 202 are controlled so as to attain the same cross-connect state. Accordingly, as shown for example in FIG. 2, assume that signals on the first channel that arrives from input path #1 are cross-connected to output path #2. As indicated by the dashed lines, the working optical cross-connects $201_1$ to $201_4$ and standby optical cross-connect 202 each cross-connect the first input to the second output. Further, the output signal of the logic circuit $205_1$ and the cross-connected first to fourth bit signals of the first channel are input to the logic circuit $211_2$ corresponding to output path #2. Since the logic circuit $205_1$ calculates the exclusive-OR of the first to fourth bit signals of the first channel prevailing prior to the cross connection, the logic circuit $211_1$ outputs the exclusive-OR between the exclusive-OR signal of the correct signals that prevailed prior to the cross connection and the four signals prevailing after the cross connection.

When Operation is Normal

If the number of "1"s of the first to fourth bits of the first channel (i=1) prior to cross connection is odd, as indicated at $\hat{1}$ in FIG. 3(a), then the output of the logic circuit $205_1$ is "1". If the working optical cross-connects $201_1$ to $201_4$ are normal, then the number of "1"s of the signals output from the second output terminals (j=2) of respective ones of these cross-connects will be odd. Accordingly, the number of "1"s input to the logic circuit $211_2$ corresponding to output path #2 will be even when totaled, and the output of the logic circuit will be "0". Further, if the number of "1"s of the first to fourth bits of the first channel prior to cross connection is even, as indicated at $\hat{2}$ in FIG. 3(a), then the output of the logic circuit $205_1$ is "0". If the working optical cross-connects $201_1$ to $201_4$ are normal, then the number of "1"s of the signals output from the second output terminals of respective ones of these cross-connects will be even. Accordingly, the number of "1"s input to the logic circuit $211_2$ corresponding to output path #2 will be even when totaled, and the output of the logic circuit will be "0".

When Operation is Abnormal

If the number of "1"s of the first to fourth bits of the first channel prior to cross connection is odd, as indicated at $\hat{3}$ in FIG. 3(b), then the output of the logic circuit $205_1$ is "1". If any one of the working optical cross-connects $201_1$ to $201_4$ becomes abnormal, then the number of "1"s of the signals output from the second output terminals of respective ones of these cross-connects will be even. Accordingly, the number of "1"s input to the logic circuit $211_2$ corresponding to output path #2 will be even when totaled, and the output of the logic circuit will be "1". Further, if the number of "1"s of the first to fourth bits of the first channel prior to cross connection is even, as indicated at $\hat{4}$ in FIG. 3(b), then the output of the logic circuit $205_1$ is "1". If any one of the working optical cross-connects $201_1$ to $201_4$ becomes abnormal, then the number of "1"s of the signals output from the second output terminals of respective ones of these cross-connects will be odd. Accordingly, the number of "1"s input to the logic circuit $211_2$ corresponding to output path #2 will be odd when totaled, and the output of the logic circuit will be "1".

Thus, if all of the cross-connects $201_1$ to $201_4$ are normal, the output of the logic circuit $211_1$ will be "0"; if any one of the cross-connects becomes abnormal, then the output of the logic circuit $211_1$ will be "1".

The foregoing is described with regard to a case where the signals that enter from the first input path #1 are cross-connected and output from the second output path #2. However, operation is similar also for a case where the signals that enter from any input path #i are cross-connected and output from any output path #j.

Further, when an abnormality has developed in one working cross-connect, all of its output signals do not necessary change from "1"to "0" or vice versa. When an abnormality develops in one cross-connect in the above example, therefore, not all of the output signals from the logic circuits $211_1$, to $211_4$ become "1" but the output of at least one logic circuit does, thereby enabling the abnormality to be detected.

Accordingly, the controller 215 performs monitoring to determine whether one output signal from any of the logic circuits $211_1$ to $211_4$ has become "1". If the output of at least logic circuit becomes "1", then the controller 215 determines that an abnormality has occurred in a cross-connect.

Description of Abnormality Detection Using Simplified Drawing

Figure 2:
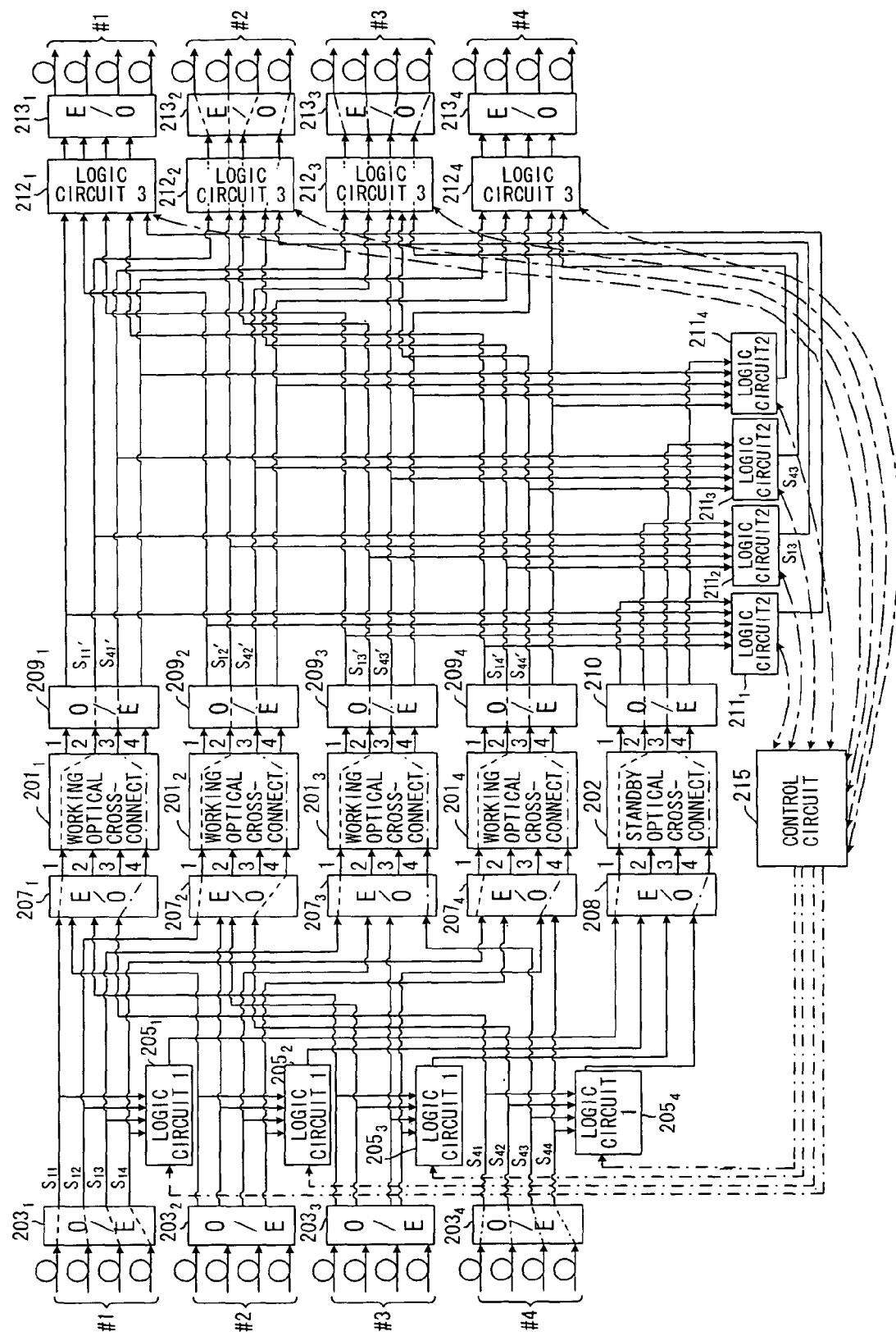
FIG. 2 is a diagram useful in describing abnormality detection, identification of an abnormal cross-connect and working/standby changeover according to the present invention.

FIG. 4 is a diagram showing the main structure of a cross-connect apparatus In which only a portion that cross-connects input path #1 to output path #2 has been extracted for illustration. Components identical with those shown in FIGS. 1 and 2 are designated by like reference characters. A serial/parallel converter (S/P) $222_1$ converts an optical serial signal that arrives from input path #1 to optical parallel signals and inputs these signals to the optoelectronic transducer (O/E) $203_i$. A parallel/serial converter (P/S) $231_2$ converts the 4-bit parallel signal that is output from the electro-optic transducer $213_2$ to a serial optical signal and sends this signal to output path #2.

The working optical cross-connects $201_1$ to $201_4$ cross-connect first to fourth bit signals $S_{11}$, $S_{12}$, $S_{13}$, $S_{14}$, which have been input to the first input terminals of respective ones of these cross-connects from the optoelectronic transducer $203_1$ to their second output terminals, as indicated by the dashed lines.

The first logic circuit $205_1$ calculates the exclusive-OR of the first to fourth bit signals $S_{11}$, $S_{12}$, $S_{13}$, $S_{14}$, of the first channel that arrives from input path #1 and inputs the operational result A to the first input terminal of the standby optical cross-connect 202.

An output signal A' of the first logic circuit $205_1$ prevailing after the cross connection and first to fourth bit signals $S_{11}'$, $S_{12}'$, $S_{13}'$, $S_{14}'$ of the first channel prevailing after the cross connection are input to the second logic circuit $211_2$. Since the first logic circuit $205_1$ calculates the exclusive-OR of the first to fourth bit signals $S_{11}'$, $S_{12}'$, $S_{13}'$, $S_{14}'$ of the first channel prevailing prior to the cross connection, the second logic circuit $211_2$ outputs the exclusive-OR between the exclusive-OR signal of the correct signals that prevailed prior to the cross connection and the four signals $S_{11}'$, $S_{12}'$, $S_{13}'$, $S_{14}'$ prevailing after the cross connection.

As described above based upon $\hat{3}$ and $\hat{4}$ in FIG. 3(b), when any one of the working optical cross-connects $201_1$ to $201_4$ develops an abnormality and the logic of the output signal thereof becomes inverted ("1"→"0" or "0"→"1"), the output B of the second logic circuit $211_2$ becomes "1". Accordingly, the control circuit 215 performs monitoring to determine whether the output of the second logic circuit $211_2$ has become "1" and decides that an abnormality has occurred if this output becomes "1".

(C) Control for Specifying Cross-Connect in which Abnormality has Occurred

If at least one of the output signals of the logic circuits $211_1$, to $211_4$ (FIG. 2) becomes "1", thus indicating that an abnormality has occurred in any one of the optical cross-connects $201_1$ to $201_4$, the controller 215 specifies the cross-connect in which the abnormality has occurred.

To accomplish this, the controller 215 inhibits entry, to the logic circuits $205_1$ to $205_4$, of the signals applied to the first optical cross-connect $201_1$ and simultaneously inhibits entry of the signals output from the first optical cross-connect $201_1$ to the logic circuits $211_1$, to $211_4$. The controller 215 then performs monitoring to determine whether the output signals of the logic circuits $211_1$ to $211_4$ are the same as during normal operation (="0"). If the first optical cross-connect $201_1$ has developed an abnormality, the input and output signals of the cross-connect $201_1$ will have been excluded from the exclusive-OR operation and, as a result, the output signals of the logic circuits $211_1$ to $211_4$ will all be "0". This makes it possible to specify that the first optical cross-connect $201_1$ is the faulty location in which the abnormality occurred.

If the first optical cross-connect $201_1$ is normal, however, the output signal of any of the logic circuits $211_1$ to $211_4$ will be "1", owing to the existence of an abnormal cross-connect, even though the input and output signals of the cross-connect $201_1$ have been excluded from the exclusive-OR operation. As a result, it can be determined that the first optical cross-connect $201_1$ has not developed an abnormality and is normal.

If the controller 215 determines that the first optical cross-connect $201_1$ is normal, then it inhibits entry, to the logic circuits $205_1$ to $205_4$, of the signals applied to the second optical cross-connect $201_2$ and simultaneously inhibits entry of the signals output from the second optical cross-connect $201_2$ to the logic circuits $211_1$ to $211_4$. The controller 215 then performs monitoring to determine whether the output signals of the logic circuits $211_1$ to $211_4$ are the same as during normal operation (="0"), thereby determining whether the second optical cross-connect $201_2$ is normal or abnormal. If the second optical cross-connect $201_2$ is found to be normal, then the controller 215 subsequently determines the normality or abnormality of the third and fourth optical cross-connects 2013, 2014 in similar fashion until the faulty location can be identified.

Description of Abnormality Detection Using Simplified Drawing

The above will be described with reference to the simplified diagram of FIG. 4. Assume that the output of the second logic circuit $211_2$ is "1" owing to occurrence of an abnormality. The controller 215 first performs control in such a manner that the first bit signals $S_{11}$, $S_{11}'$ will not enter the first logic circuit $205_1$ and second logic circuit 2112, respectively. If the first optical cross-connect $201_1$ develops an abnormality, the input and output signals $S_{11}$, $S_{11}'$ of the cross-connect $201_1$ are excluded from the exclusive-OR operation and therefore the output signal of the logic circuit $211_2$ becomes "0". As a result, the controller 215 is capable of determining that an abnormality has occurred in the first optical cross-connect $201_1$ and can specify the faulty location.

If the first optical cross-connect $201_1$ is normal, however, the output signal of the logic circuit $211_2$ will be "1", owing to the fact that another abnormal cross-connect exists, even though the input and output signals $S_{11}$, $S_{11}'$ of the cross-connect $201_1$ have been excluded from the exclusive-OR operation. As a result, it can be determined that the first optical cross-connect $201_1$ has not developed an abnormality and is normal.

If the controller 215 determines that the first optical cross-connect $201_1$ is normal, it then performs control in such a manner that the second bit signals $S_{12}$, $S_{12}'$ will not enter the first logic circuit $205_1$ and second logic circuit $211_2$, respectively. If the second optical cross-connect $201_2$ develops an abnormality, the input and output signals $S_{12}$, $S_{12}'$ of the cross-connect $201_2$ are excluded from the exclusive-OR operation and therefore the output signal of the logic circuit $211_2$ becomes "0". As a result, the controller 215 is capable of determining that an abnormality has occurred in the second optical cross-connect $201_2$ and can specify the faulty location.

If the second optical cross-connect $201_2$ is normal, however, the output signal of the logic circuit $211_2$ will be "1", owing to the fact that another abnormal cross-connect exists, even though the input and output signals $S_{12}$, $S_{12}'$ of the cross-connect $201_2$ have been excluded from the exclusive-OR operation. As a result, it can be determined that the second optical cross-connect $201_2$ has not developed an abnormality and is normal. The controller 215 thenceforth executes similar control until it is able to specify the faulty location.

(D) Control for Changing Over Output Signal at Time of Abnormality

Described next will be changeover control in a case where the signals of the first channel arriving from input path #1 are cross-connected to output path #2 (see the dashed lines in FIG. 2) and the signals of the fourth channel arriving from input path #4 are cross-connected to output path #3 (see the dot-and-dash lines in FIG. 2). If the fact that an abnormality has occurred in a kth cross-connect $201_k$ (e.g., k=3) is detected in the cross-connect state described above, the controller 215 inhibits the signals that are output from this kth cross-connect from entering the logic circuits $211_1$, to $211_4$.

As a result, output signal A' of the logic circuit $205_1$ and all of the first to fourth bit signals of the first channel prevailing after cross connection, with the exception of the signal of the kth bit (k=3), are input to the logic circuit $211_2$ corresponding to output path #2 (see FIG. 4). The logic circuit $205_1$ calculates the exclusive-OR of the first to fourth bit signals of the first channel that prevailed prior to the cross connection. Therefore, it we let $S_{11}$ to $S_{14}$ represent the first to fourth bits signals of the first channel that prevailed before cross connection and let $S_{11}'$ to $S_{14}'$ represent the first to fourth bits signals of the first channel prevailing after cross connection, and if k=3 holds, then the output of the logic circuit $211_2$ corresponding to output path #2 will be the exclusive-OR of the following signals:

$S_{11}, S_{12}, S_{13}, S_{14}, S_{11}', S_{12}', S_{14}'$

Since the signals $S_{11}', S_{12}', S_{14}'$ are the outputs of the normal cross-connects, they agree with the signals $S_{11}, S_{12}, S_{14}$. As a result, whether the number of "1" signals among the above-mentioned seven signals is even or odd depends upon the third bit signal $S_{13}$. In other words, the output of the logic circuit $211_2$ is the third bit signal $S_{13}$.

The logic circuit $212_2$ includes four selectors $SEL_{21}$, $SEL_{22}, SEL_{23}, SEL_{24}$ having first input terminals connected to the second output terminals of the working optical cross-connects $201_1$ to $201_4$ and second input terminals connected to the output terminals of the logic circuit $211_2$. The controller 215 instructs each of the selectors of the logic circuit $212_2$ to select the signals output from the second output terminals of the cross-connects $201_1, 201_2, 201_4$ as the first, second and fourth bit signals and to select the signal $S_{13}$ output from the logic circuit $211_2$ as the third bit signal. As a result, the logic circuit $212_2$ selects and outputs $S_{11}', S_{12}', S_{13}, S_{14}'$ as the first to fourth bit signals.

Further, the output signal of the logic circuit $205_4$ and all of the first to fourth bit signals of the fourth channel prevailing after cross connection, with the exception of the signal of the kth bit (k=3), are input to the logic circuit $211_3$ corresponding to output path #3 (see FIG. 2). The logic circuit $205_4$ calculates the exclusive-OR of the first to fourth bit signals of the fourth channel that prevailed prior to the cross connection. Therefore, it we let $S_{41}$ to $S_{44}$ represent the first to fourth bits signals of the fourth channel that prevailed before cross connection and let $S_{41}'$ to $S_{44}'$ represent the first to fourth bits signals of the fourth channel prevailing after cross connection, and if k=3 holds, then the output of the logic circuit $211_3$ corresponding to output path #3 will be the exclusive-OR of the following signals:

$S_{41}, S_{42}, S_{43}, S_{44}, S_{41}', S_{42}', S_{44}'$

Since the signals $S_{41}', S_{42}', S_{44}'$ are the outputs of the normal cross-connects, they agree with the signals $S_{41}, S_{42}, S_{44}$. As a result, whether the number of "1" signals among the above-mentioned seven signals is even or odd depends upon the third bit signal $S_{13}$. In other words, the output of the logic circuit $211_3$ is the third bit signal $S_{43}$. The controller 215 instructs each of the selectors of the logic circuit $212_3$ to select the signals output from the third output terminals of the cross-connects $201_1, 201_2, 201_4$ as the first, second and fourth bit signals and to select the signal $S_{43}$ output from the logic circuit $211_3$ as the third bit signal. As a result, the logic circuit $212_3$ selects and outputs $S_{41}', S_{42}', S_{43}, S_{44}'$ as the first to fourth bit signals.

Similarly, the logic circuits $212_1$ and $212_4$ select, and send to output paths #1 and #4, the output signals of the logic circuits $211_1, 211_4$ instead of the signals output from the third cross-connect $201_3$ (k=3) as the third bit signal.

In the description given above, it is assumed that an abnormally occurs in the third cross-connect. However, operation is similar even if an abnormality occurs in any kth cross-connect, and the logic circuits $212_1$ to $212_4$ select and output the output signals of the logic circuits $211_1$ to $211_4$ instead of the signals output from the kth cross-connect $201_k$.

Further, in the description given above, the case described is one in which the signals of the first channel arriving from input path #1 are cross-connected to output path #2 and the signals of the fourth channel arriving from input path #4 are cross-connected to output path #3. However, it should be obvious that the invention will hold true for any state of cross connection.

(E) Recovery Control

Logic circuits (not shown in FIGS. 1 and 2) are provided for checking whether output signals of the logic circuits $211_1$ to $211_4$ agree with respective ones of four signals output from the first to fourth output terminals of an ith cross-connect $201_i$ in which an abnormality has been detected, and the controller 215 monitors the outputs of these logic circuits and determines that the ith cross-connect $201_i$ has returned to normal in response to signal agreement that continues for a predetermined period of time. If the controller 215 determines that the normal state has been restored, then it switches the state of each logic circuit back to the state that prevails under normal operation, and the logic circuits $212_1$ to $212_4$ select, and output to the output paths #1 to #4, signals that have been cross-connected by the working optical cross-connects $201_1$ to $201_4$.

(F) Structure of Logic Circuits (a) First Logic Circuits

Figure 5:
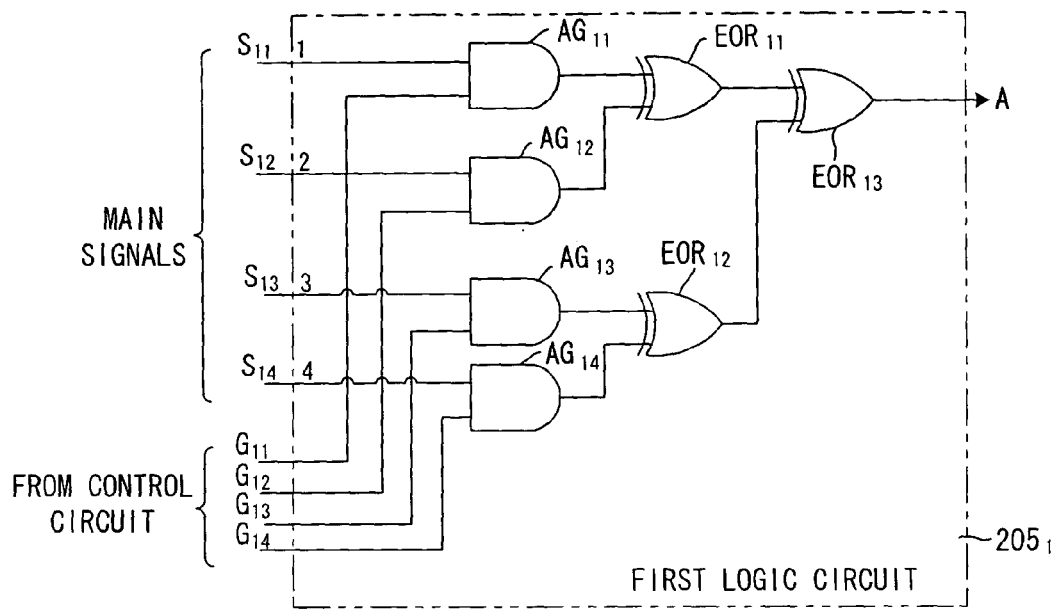
FIG. 5 is a diagram showing the structure of a first logic circuit.

The logic circuits $205_1$ to $205_4$ are identical in structure. Among these logic circuits, the logic circuit $205_1$ comprises four AND gates $AG_{11}$, to $AG_{14}$ for controlling passage of the first to fourth bit signals $S_{11}$ to $S_{14}$ of the first channel, and three exclusive-OR gates $EOR_{11}$ to $EOR_{13}$ for calculating the exclusive-OR of the first to fourth bit signals $S_{11}$ to $S_{14}$, as illustrated in FIG. 5. It is so arranged that gate signals $G_{11}$ to $G_{14}$ usually are at the high level, as a result of which the logic circuit outputs the exclusive-OR signal A of the first to fourth bit signals $S_{11}$ to $S_{14}$.

When a faulty cross-connect is specified, however, the controller 215 sends the gate signals $G_{11}$ to $G_{14}$ to the low level in the following order: $G_{11} \rightarrow G_{12} \rightarrow G_{13} \rightarrow G_{14}$, thereby inhibiting passage of one signal from among the first to fourth bit signals $S_{11}$ to $S_{14}$ so that the logic circuit outputs an exclusive-OR signal of the other three signals.

(b) Second Logic Circuit

Figure 6:
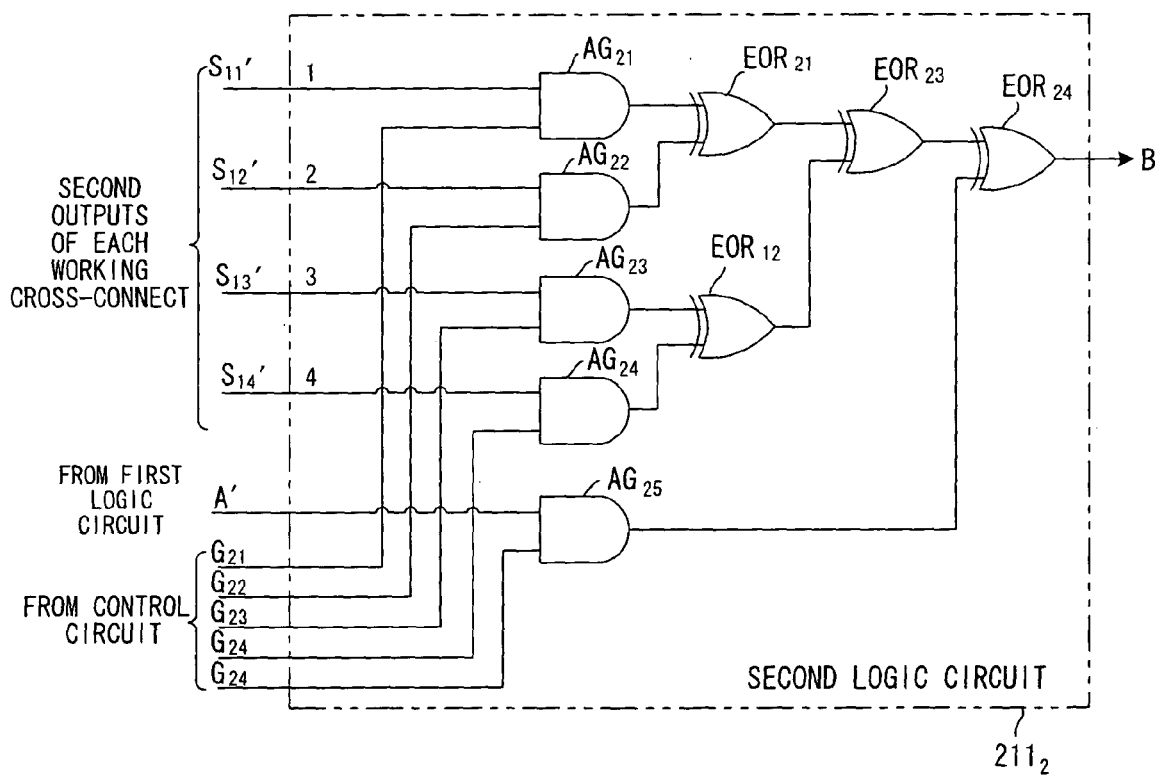
FIG. 6 is a diagram showing the structure of a second logic circuit.

The second logic circuits $211_1$ to $211_4$ are identical in structure. Among these logic circuits, logic circuit $211_2$ comprises four AND gates $AG_{21}$ to $AG_{24}$ for controlling passage of the signals (signals $S_{11}'$ to $S_{14}'$ in the example of FIG. 4) output from the second output terminals of the first to fourth cross-connects $201_1$ to $201_4$; an AND gate AG25 for controlling passage of the signal (signal A' in the example of FIG. 4) output from the second output terminal of the standby optical cross-connect 202; and four exclusive-OR gates $EOR_{21}$ to $EOR_{24}$ for calculating the exclusive-OR of the outputs from each of the above-mentioned AND gates, as illustrated in FIG. 6. It is so arranged that gate signals $G_{11}$ to $G_{14}$ usually are at the high level, as a result of which the logic circuit outputs the exclusive-OR signal A of the first to fourth bit signals $S_{11}$ to $S_{14}$. It is so arranged that gate control signals $G_{21}$ to $G_{25}$ usually are at the high level, as a result of which the second logic circuit $211_2$ outputs a signal B obtained by calculating the exclusive-OR between the first to fourth bit signals $S_{11}'$ to $S_{14}'$ prevailing after cross connection and the output signal A' of the first logic circuit in the case of FIG. 4.

When a faulty cross-connect is specified, however, the controller 215 sends the gate signals $G_{11}$ to $G_{24}$ to the low level in the following order: $G_{21} \rightarrow G_{22} \rightarrow G_{23} \rightarrow G_{24}$, and the second logic circuit $211_2$ outputs the signal B obtained by calculating the exclusive-OR between three signals remaining after any one signal is excluded from the first to fourth bits signals $S_{11}'$ to $S_{14}'$ prevailing after cross connection, and the output signal A' of the first logic circuit.

Further, if it is found that the faulty cross-connect is the kth cross-connect, then the controller 215 sends the gate signal $G_{2k}$ to the low level, thereby inhibiting passage of the signal $S_{1k}$ that is output from the second output terminal of the kth cross-connect, so that the logic circuit outputs the signal B by calculating the exclusive-OR between the other three signals and the output signal A' of the first logic circuit. Since k=3 holds in the example of FIG. 4, the gate signal $G_{23}$ assumes the low level and passage of the signal $S_{13}'$ output from the second output terminal of the third cross-connect $201_3$ is inhibited. As a result, the second logic circuit $211_2$ outputs the third bit signal $S_{13}$ of the first channel as the output signal B.

(c) Third and Fourth Logic Circuits

The third logic circuits $212_1$ to $212_4$ are identically constructed. The third logic circuit 2122 corresponding to the output path #2 has the four selectors $SEL_{21}$ to $SEL_{24}$, as described above with reference to FIG. 4. In the case of FIG. 4, the first input terminals of the selectors $SEL_{21}$ to $SEL_{24}$ are connected to the second output terminals of the working cross-connects $201_1$ to $201_4$, and the second input terminals are connected to the output of the logic circuit $211_2$. If an abnormality has occurred in the third cross-connect $201_3$, the controller 215 instructs the selectors $SEL_{21}$, $SEL_{22}$, $SEL_{24}$ of the logic circuit $212_2$ to select the signals that are output from the second output terminals of the optical cross-connects $201_1$, $201_2$, $201_4$, and instructs the selector $SEL_{23}$ to select the signal $S_{13}$ that is output from the logic circuit $211_2$. As a result, the logic circuit $212_2$ selects and outputs $S_{11}'$, $S_{12}'$, $S_{13}$, $S_{14}'$ as the first to fourth bit signals.

Figure 7:
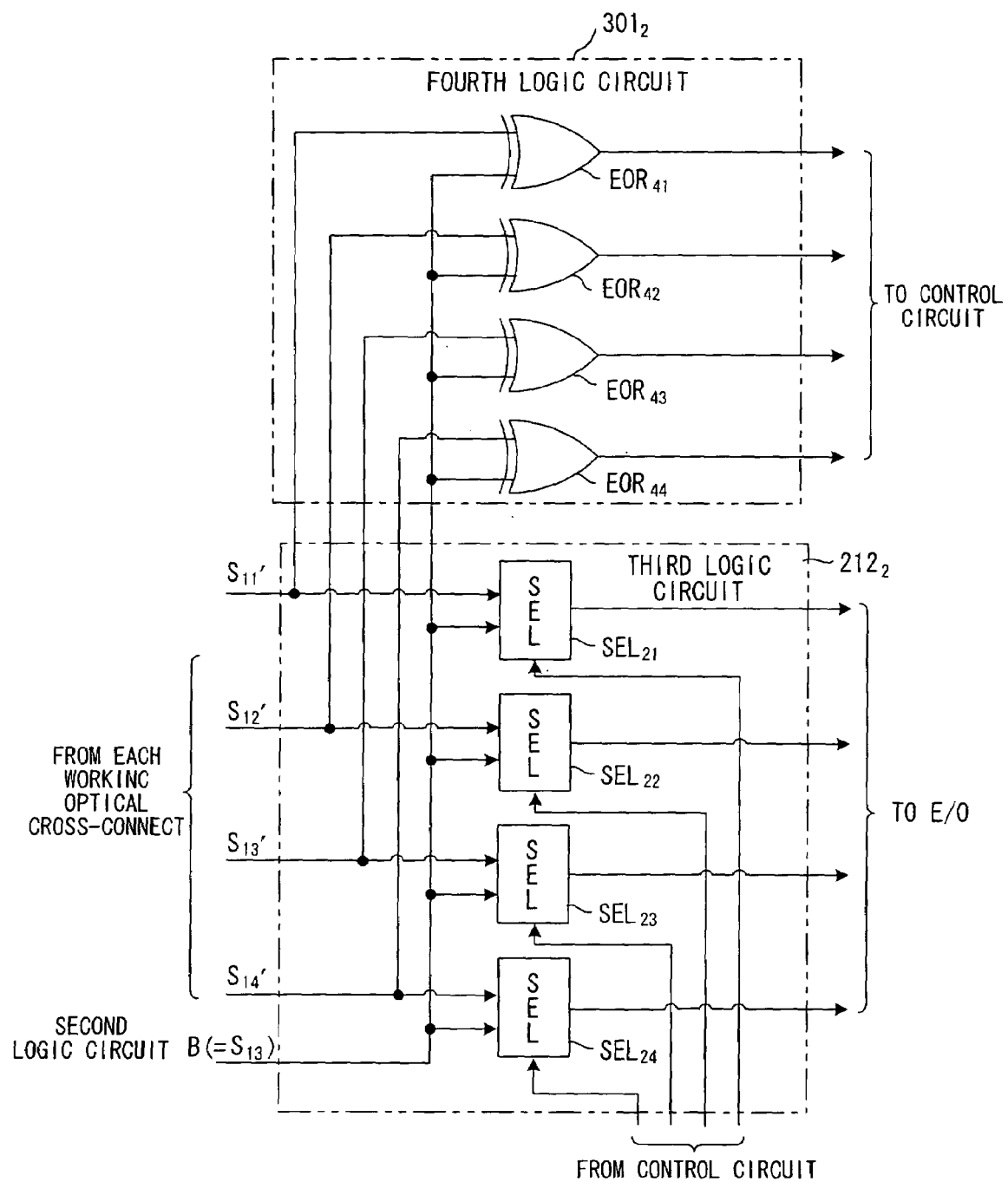
FIG. 7 is a diagram showing the structures of third and fourth logic circuits.

Four of the fourth logic circuits are provided and form pairs with the third logic circuits. In FIG. 7, one logic circuit $301_2$ forming a pair with the third logic circuit $212_2$ is shown. The four fourth logic circuits each have exclusive-OR gates $EOR_{41}$ to $EOR_{44}$ and check to determine whether the four output signals of the second logic circuits $211_1$ to $211_4$ agree with the four output signals of the faulty kth cross-connect $201_k$, and the controller 215 determines that the kth cross-connect $201_k$ has returned to normal in response to agreement that continues for a predetermined period of time. More specifically, the fourth logic circuit $301_2$ corresponding to output path #2 in FIG. 7 performs monitoring to determine, based upon the output of the gate $EOR_{43}$, whether the second output signal $S_{13}'$ of the faulty third cross-connect $201_3$ and the output signal $S_{13}$ of the second logic circuit $211_2$ agree. The other fourth logic circuits also monitor for agreement in the same manner.

(d) Implementation Having Signal Cut-Off Detecting Circuits

In the foregoing, abnormalities in cross-connects are detected based upon "1" outputs from the second logic circuits $211_1$ to $211_4$. However, detection of abnormality can also be performed in response to the output signals of the optical cross-connects $201_1$ to $201_4$ being severed continuously in excess of a predetermined period of time.

Figure 8:
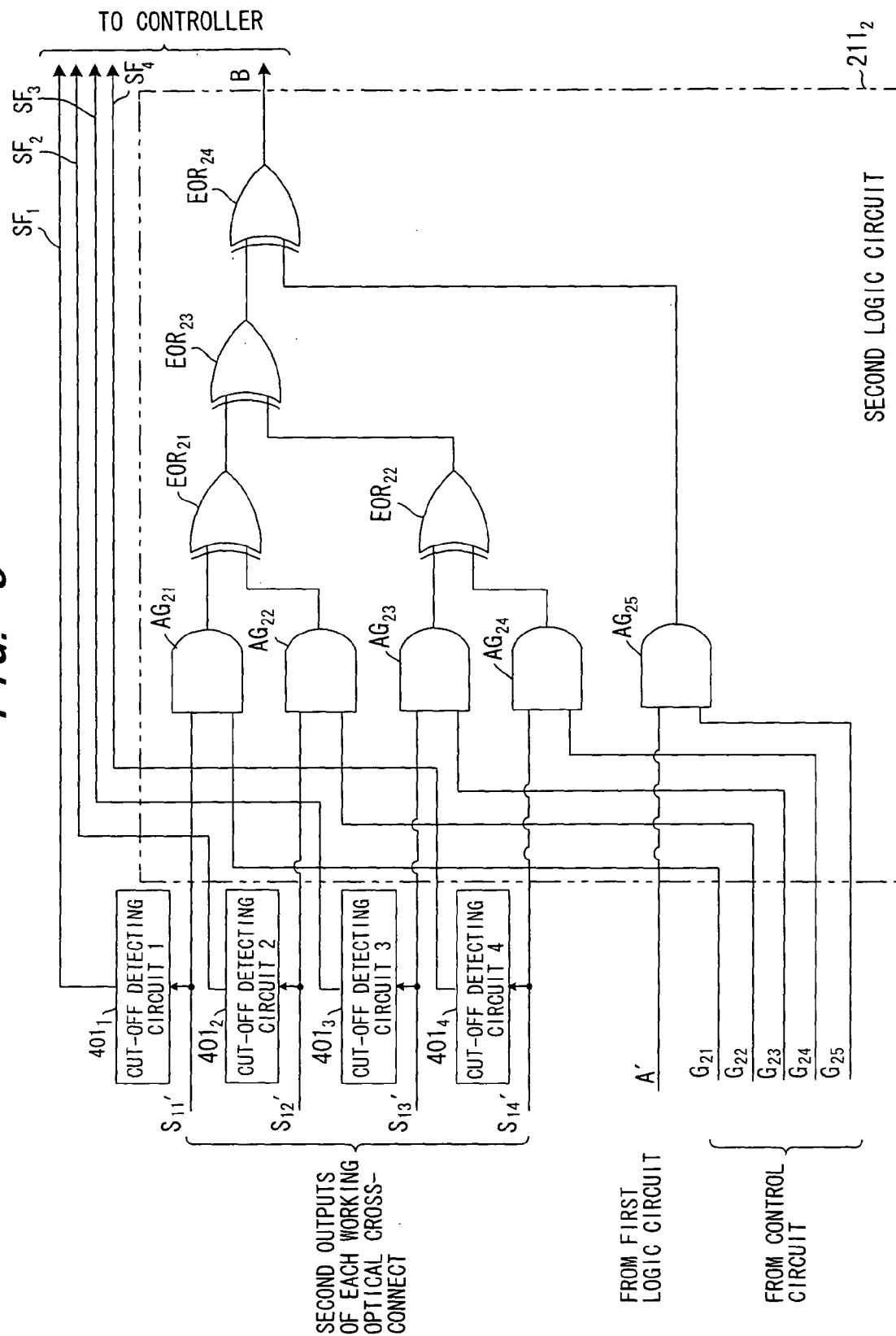
FIG. 8 is a diagram useful in describing placement of signal cut-off detecting circuits.

FIG. 8 is a diagram useful in describing placement of signal cut-off detecting circuits. Components in FIG. 8 identical with those shown in FIG. 6 are designated by like reference characters. The second output signals of the optical cross-connects $201_1$ to $201_4$ are input to the second logic circuit $211_2$ corresponding to output path #2. Signal cut-off detecting circuits $401_1$ to $401_4$ detect the fact that the second output signals of these cross-connects $201_1$ to $201_4$ have been severed continuously in excess of a predetermined period of time and so notify the controller 215.

Figure 9:
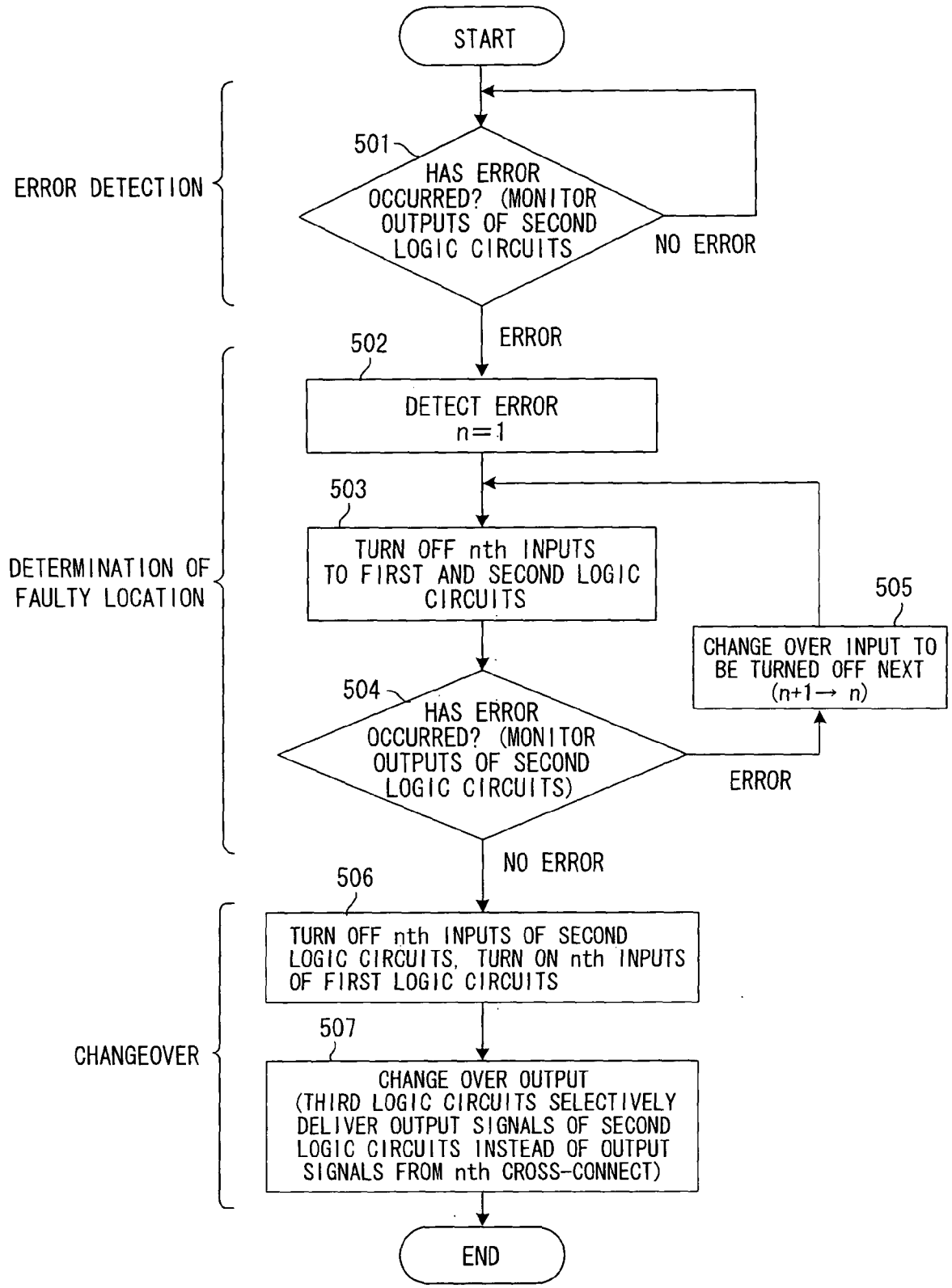
FIG. 9 is a flowchart of processing for detecting abnormality and controlling output changeover.

(G) Flow of Various Processes (a) Abnormality Detection and Control of Output Changeover FIG. 9 is a flowchart of processing for detecting abnormality and controlling output changeover.

The controller 215 monitors whether any of the outputs of the second logic circuits $211_1$ to $211_4$ has become logical "1" (step 501). If an output becomes "1", the controller decides that an abnormality has occurred in any one of the working optical cross-connects $201_1$ to $201_4$, establishes the relation n=1 and starts processing to specify the faulty location (step 502).

The controller 215 turns off the nth input signal to each of the first logic circuits $205_1$ to $205_4$ and the nth input signal to each of the second logic circuits $211_1$ to $211_4$ (step 503). In actuality, the controller sends the gate signals $G_{1n}$ and $G_{2n}$ in FIGS. 5 and 6 to the low level, thereby arranging it so that the nth input to each of the first and second logic circuits will not take part in the exclusive-OR operation.

Under these conditions, the controller 215 performs monitoring to determine whether all outputs of the second logic circuits $211_1$ to $211_4$ are "0" (step 504). If all outputs are not "0", then the controller decides that the nth cross-connect $201_n$ is not abnormal, increments n by the operation n+1→n (step 505) and repeats processing from step 503 onward. If it is found at step 504 that all outputs of the second logic circuits $211_1$ to $211_4$ are "0", on the other hand, then the controller decides that the nth cross-connect $201_n$ is the abnormal cross-connect and exits control for the faulty location.

Next, the controller 215 continues holding the nth input to each of the second logic circuits $211_1$ to $211_4$ in the off state restores the nth input of each of the first logic circuits $205_1$ to $205_4$ from the off to the on state (step 506). As a result, the output signals of the second logic circuits $211_1$ to $211_4$ become correct signals that should be output by the nth cross-connect $201_n$.

Further, the controller 215 instructs the third logic circuits $212_1$ to $212_4$ to select the output signals of the second logic circuits $211_1$ to $211_4$ instead of the output signals of the nth cross-connect $201_n$, (step 507). As a result, the third logic circuits $212_1$ to $212_4$ change over the selected signals from the output signals of the nth cross-connect $201_n$ to the output signals of the second logic circuits $211_1$ to $211_4$, thereby outputting the correct signals.

Figure 10:
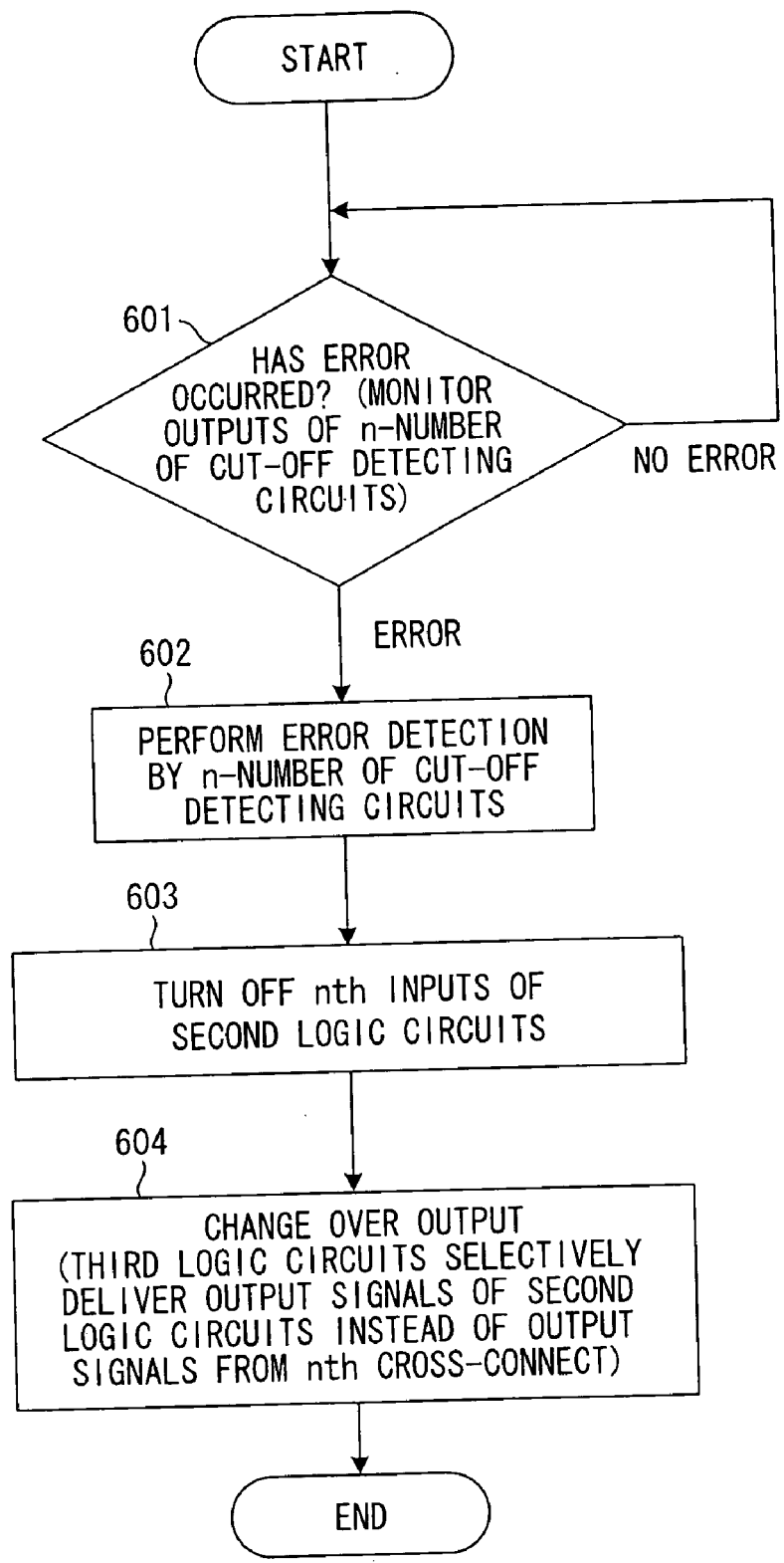
FIG. 10 is a flowchart of processing in a case where abnormality has been detected by the signal cut-off detecting circuit.

(b) Abnormality Detection and Control of Output Changeover by Signal Cut-Off Detecting Circuit FIG. 9 relates to a case where abnormality in a cross-connect is detected by monitoring the output signals of the second logic circuits $211_1$ to $211_4$. FIG. 10, however, shows a processing flowchart in a case where abnormality is detected by the signal cut-off detecting circuits $401_1$ to $401_4$ (see FIG. 8).

The controller 215 monitors whether any output signals SF1 to SF4 of the signal cut-off detecting circuits $401_1$ to $401_4$ has become logical "1" (step 601). If an abnormality has occurred in the nth cross-connect $201_n$ and the output signal thereof is cut off in excess of a predetermined period of time, then the signal cutoff detecting circuit $401_n$ outputs a cut-off signal $SF_n$. The controller 215 responds by recognizing that the nth cross-connect $201_n$ has developed an abnormality (step 602).

Next, the controller 215 turns off the nth input to each of the second logic circuits $211_1$ to $211_4$ (step 603). As a result, the output signals of the second logic circuits $211_1$ to $211_4$ become correct signals that should be output by the nth cross-connect $201_n$.

Further, the controller 215 instructs the third logic circuits $212_1$ to $212_4$ to select the output signals of the second logic circuits $211_1$ to $211_4$ instead of the output signals of the nth cross-connect $201_n$ (step 604). As a result, the third logic circuits $212_1$ to $212_4$ change over the selected signals from the output signals of the nth cross-connect $201_n$ to the output signals of the second logic circuits $211_1$ to $211_4$, thereby outputting the correct signals.

(c) Recovery Processing

Figure 11:
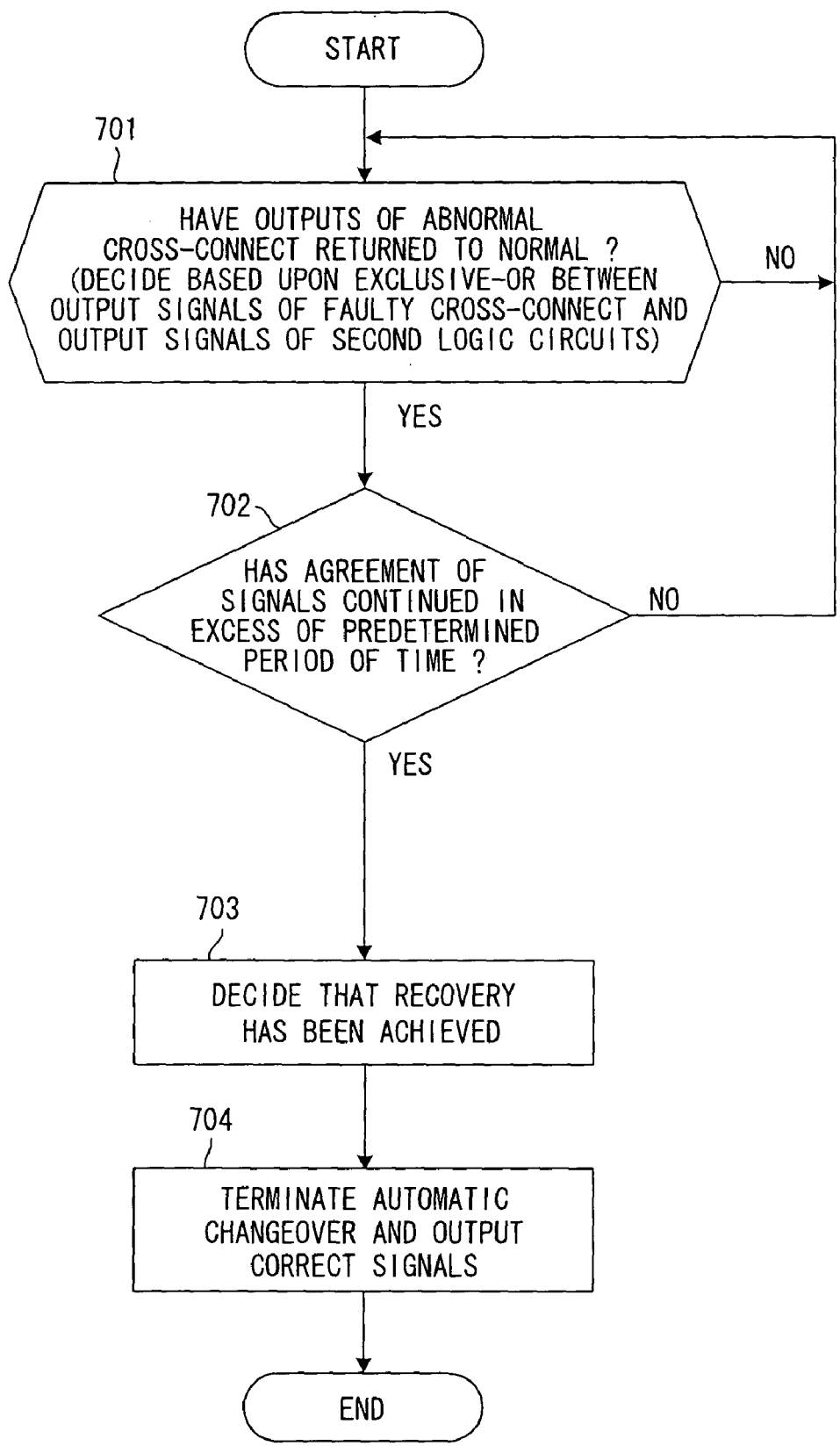
FIG. 11 is a flowchart of recovery processing.

FIG. 11 is a flowchart of recovery processing.

Under conditions in which the output signals of a kth cross-connect $201_k$ have been changed over (the condition prevailing at step 507 in FIG. 9 or at step 604 in FIG. 10) owing to occurrence of an abnormality in this cross-connect, the controller 215 monitors whether the kth cross-connect $201_k$ has been restored to normal based upon exclusive-OR signals output from four fourth logic circuits $301_1$ to $301_4$ (only logic circuit $301_2$ is shown in FIG. 7). Specifically, the controller 215 performs monitoring to determine whether the four output signals of the second logic circuits $211_1$ to $211_4$ and the four output signals of the kth cross-connect $201_k$ agree (step 701). If the signals agree, then the controller checks to see whether agreement continues in excess of a set period of time (step 702). If agreement does not continue in excess of the set period of time, the controller repeats processing from step 701 onward. If agreement does continue in excess of the set period of time, the controller 215 decides that the kth cross-connect $201_k$ has returned to normal (step 703).

If it has decided that the normal state has been restored, the controller 215 terminates automatic changeover of the outputs due to occurrence of abnormality and restores the normal state that originally prevailed (step 704). That is, the controller sends all gate signals $G_{ij}$ (FIGS. 5, 6) in the second logic circuits to the high level and instructs the third logic circuits (FIG. 7) to select the output signals from working cross-connects.

Figure 12:
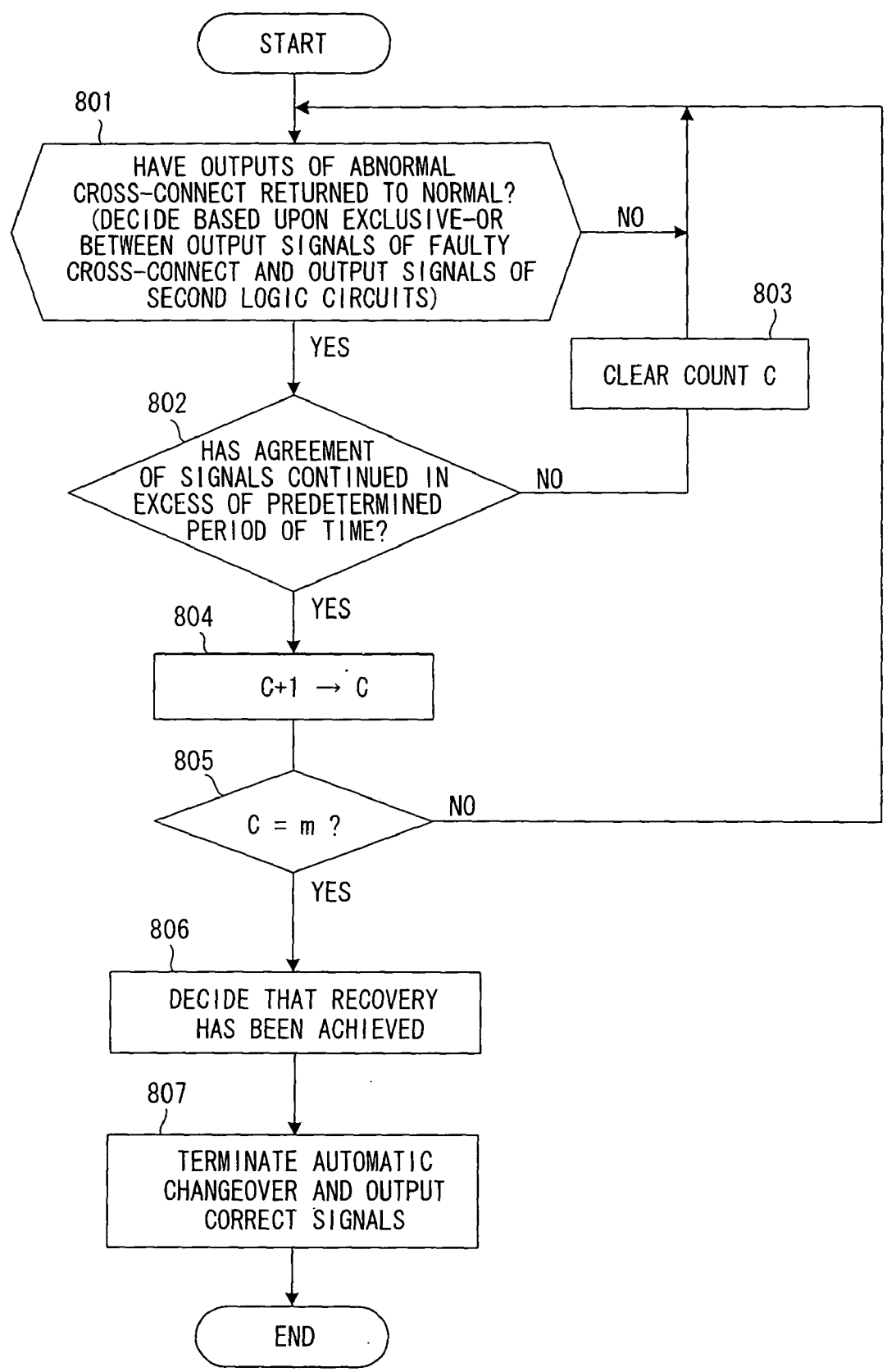
FIG. 12 is another flowchart of recovery processing.
Figure 13:
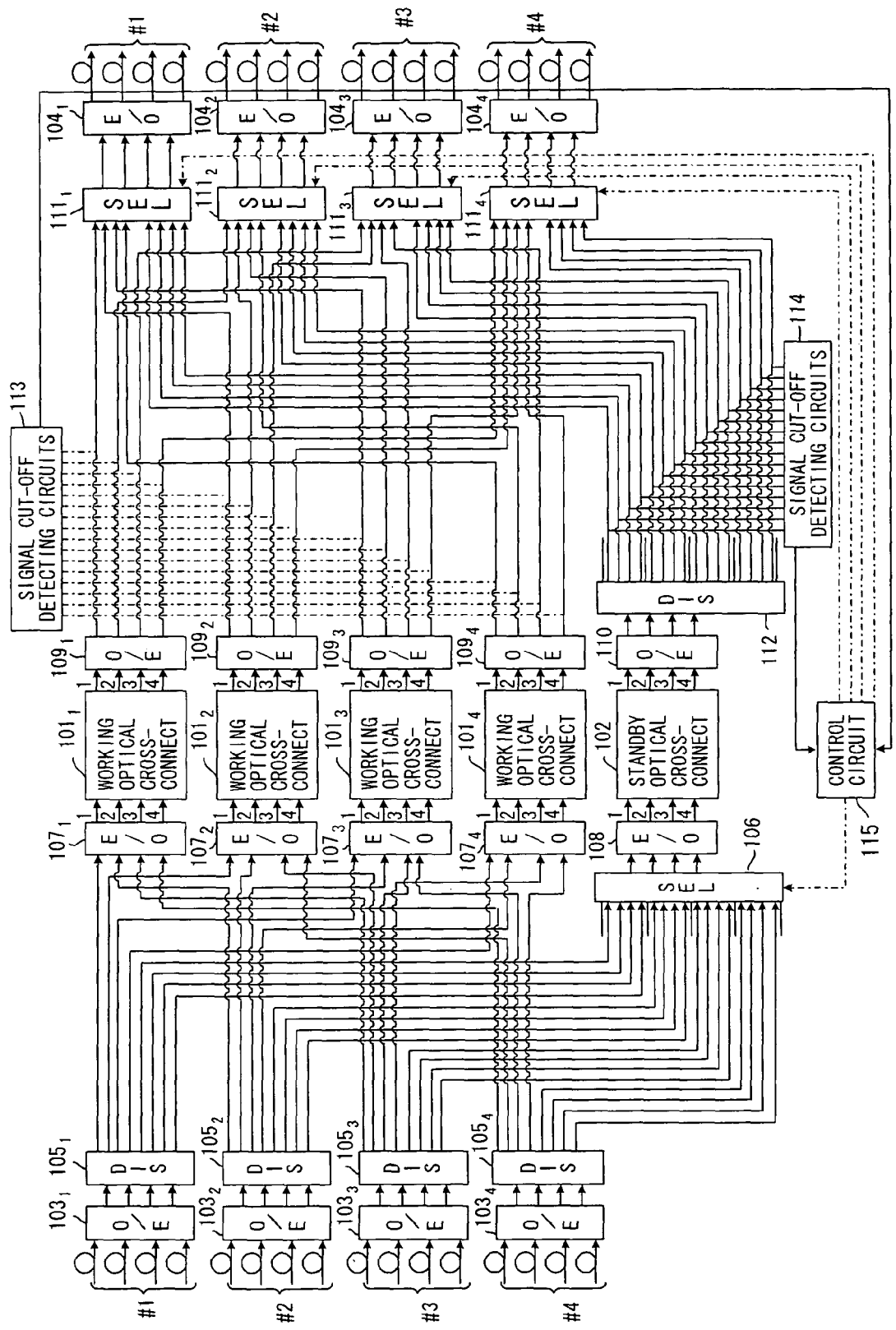
FIG. 13 is a diagram illustrating the structure of an optical cross-connect apparatus according to the prior art.
Figure 14:
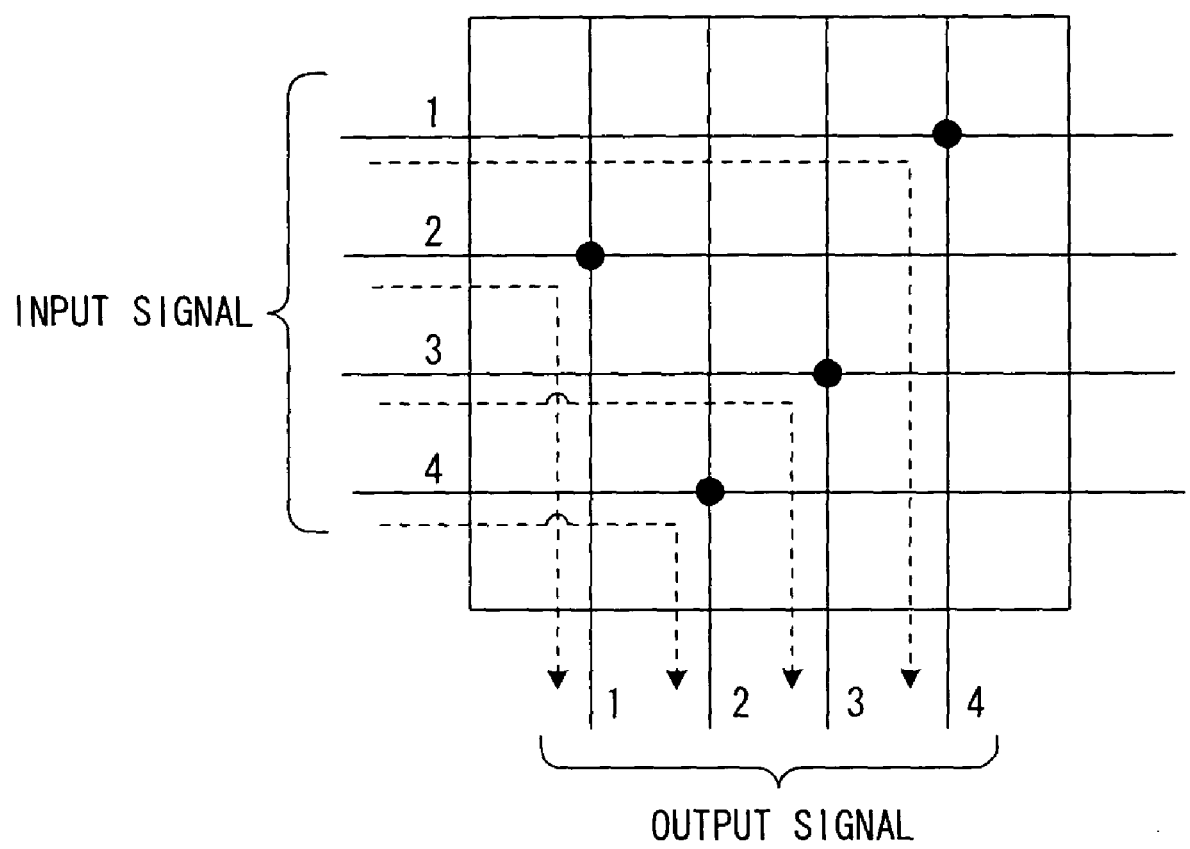
FIG. 14 is a diagram useful in describing cross-connect.
Figure 15:
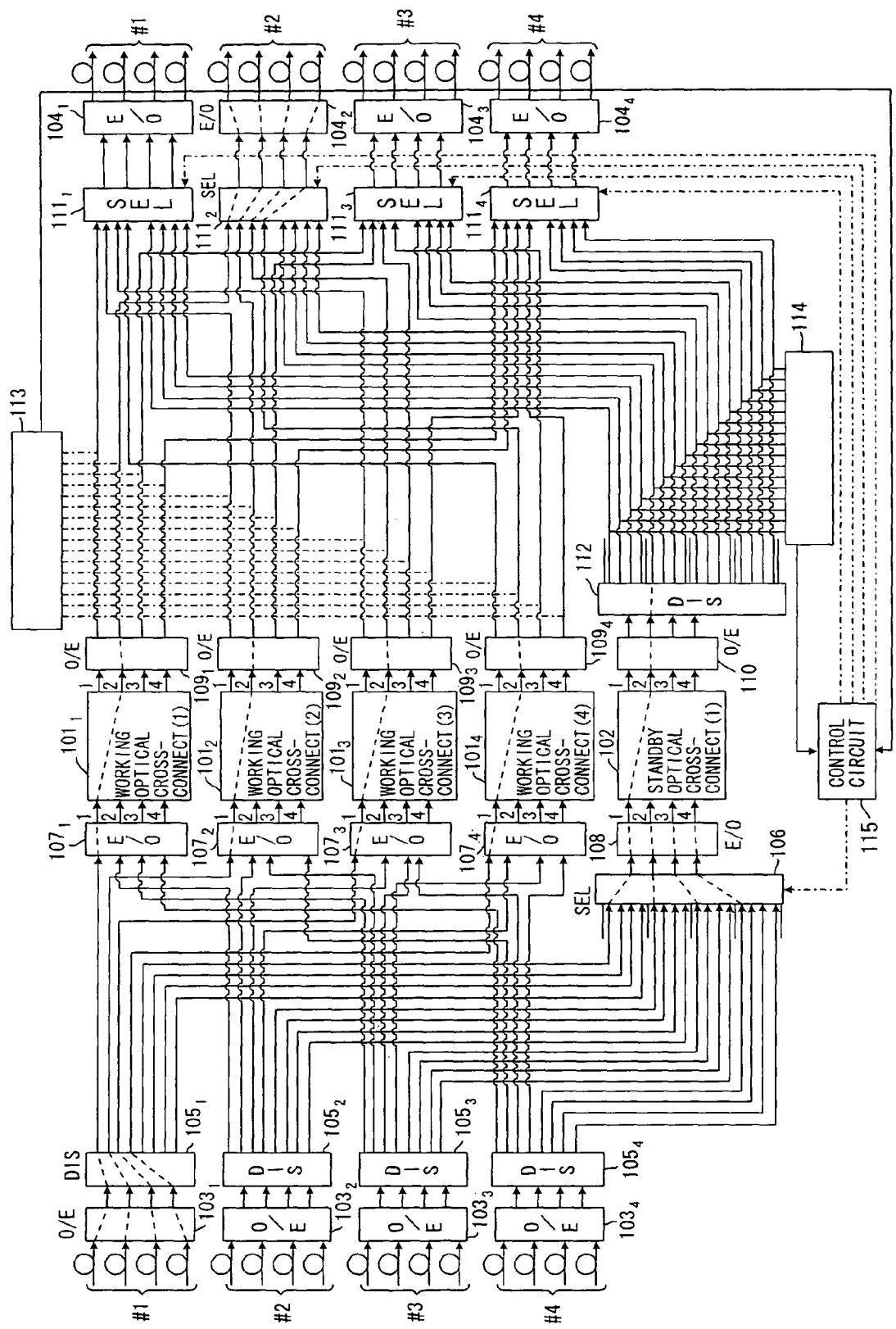
FIG. 15 is a diagram useful in describing operation of the optical cross-connect apparatus according to the prior art.

FIG. 12 is another flowchart of recovery processing. This is a flow of processing for deciding that recovery has been achieved in a case where agreement of signals is obtained a set number of times in succession.

Under conditions in which the output signals of a kth cross-connect $201_k$ have been changed over owing to occurrence of an abnormality in this cross-connect, the controller 215 performs monitoring to determine whether the four output signals of the second logic circuits $211_1$ to $211_4$ and the four output signals of the kth cross-connect $201_k$ agree (step 801). If the signals agree, then the controller checks to see whether agreement continues in excess of a set period of time (step 802). If agreement does not continue in excess of the set period of time, then the controller clears a count value c to zero (step 803) and repeats processing from step 801 onward. If agreement does continue in excess of the set period of time, the controller 215 counts up the value c (step 804), checks to see whether the count value c has become equal to a set value m (step 805) and repeats processing from step 801 onward if equality has not been achieved.

If the count value c has become equal to the set value m, the controller 215 decides that the kth cross-connect $201_k$ has returned to normal (step 806). The controller 215 then terminates automatic changeover of the outputs due to occurrence of abnormality and restores the normal state that originally prevailed (step 807).

Thus, in accordance with the present invention, abnormality in a cross-connect can be detected by a simple arrangement of logic circuits. Moreover, an abnormality can be detected not only at cut-off of a signal from a cross-connect but also in a case where a signal changes from "1" to "0" or from "0" to "1" in a cross-connect.

In accordance with the present invention, occurrence of abnormality in any working cross-connect can be detected by a simple arrangement of logic circuits.

In accordance with the present invention, changeover of working and standby optical cross-connects can be performed by a simple arrangement of logic circuits, thereby alleviating the control load involved in a working and standby changeover operation.

In accordance with the present invention, recovery can be detected by a simple arrangement of logic circuits and it is possible to switch back to a working cross-connect from the standby cross-connect unerringly.

In accordance with the present invention, it is possible to provide a highly reliable optical cross-connect apparatus at minimum cost in comparison with the cross-connect apparatus of the prior art.

In accordance with the present invention, the specifying of faulty locations and the changeover/switch-back of output signals can be carried out at high speed by gating control.

What is claimed is:

1. A cross-connect apparatus having first to nth working cross-connects for changing over output paths of n-bit input signals that arrive from respective ones of m-number of input paths, and a connection architecture for inputting first to nth bit data of an input signal that arrives from an ith input path (i=1 to m) to respective ones of ith input terminals of the first to nth working cross-connects and sending bit data that is output from jth output terminals (j=1 to m) of the first to nth working cross-connects to a jth output path, said apparatus comprising:

m-number of first logic circuits respectively for calculating the exclusive-OR of the first to nth bit data of an input signal that arrives from an ith input path (i=1 to m);

a standby cross-connect having an ith terminal to which is input an output signal of a first logic circuit that corresponds to the ith input path (i=1 to m);

m-number of second logic circuits respectively for calculating the exclusive-OR of signals output from the jth terminals (j=1 to m) of the first to nth working cross-connects and of said standby cross-connect; and abnormality detecting means for monitoring output signals of said second logic circuits when the working and standby cross-connects have all been set to the same cross-connect state, and detecting that an abnormality has occurred in any of the n-number of working cross-connects in response to generation of an output signal that differs from that when operation is normal.

2. A cross-connect apparatus according to claim 1, further comprising:
a serial/parallel converter for converting an n-bit serial signal that arrives from each input path to a parallel signal; and
a parallel/serial converter for converting a parallel signal of n bits output from jth output terminals (j=1 to m) of the first to nth working cross-connects to a serial signal and sending the serial signal to a jth output path.

3. A cross-connect apparatus according to claim 1, further comprising:
abnormal cross-connect specifying means which, when specifying a working cross-connect in which an abnormality has occurred, foregoes inputting signals that enter an ith working cross-connect to the first logic circuits, foregoes inputting signals that are output from the ith cross-connect to the second logic circuits, monitors whether the output signals of the second logic circuits at this time are the same as when operation is normal, increments i successively, thereby changing over the signals that are not input to each of the logic circuits, and decides that an abnormality has occurred in the ith working cross-connect when the output signals of the second logic circuits become the same as when operation is normal.

4. A cross-connect apparatus according to claim 3, further comprising:
first gate circuits for controlling gating of respective ones of the n-number of signals input to each of the first logic circuits; and
second gate circuits for controlling gating of respective ones of the n-number of signals input to each of the second logic circuits;
wherein said specifying means changes over the signals that are not input to each of the first and second logic circuits by controlling opening and closing of each of the gates.

5. A cross-connect apparatus according to claim 1, further comprising:
signal cut-off detecting means provided on an output side of each working cross-connect for detecting whether a signal from a working cross-connect has been cut off, thereby detecting an abnormality in said working cross-connect.

6. A cross-connect apparatus according to claim 1, 3 or 5, further comprising:
a controller for exercising control in such a manner that signals output from an ith working cross-connect will not be input to the second logic circuits when an abnormality has occurred in the ith working cross-connect; and
third logic circuits, responsive to a command from said controller, for replacing m-number of signals output from the ith working cross-connect with output signals of m-number of the second logic circuits.

7. A cross-connect apparatus according to claim 6, further comprising:
fourth logic circuits for checking whether output signals of m-number of the second logic circuits agree with m-number of signals output from an ith working cross-connect in which an abnormality has been detected; and
means for determining that the ith working cross-connect has returned to normal, based upon agreement of the signals that continues for a predetermined period of time.

8. A cross-connect apparatus according to claim 6, further comprising:
fourth logic circuits for checking whether output signals of m-number of the second logic circuits agree with m-number of signals output from an ith working cross-connect in which an abnormality has been detected; and
means for determining that the ith working cross-connect has returned to normal, based upon a predetermined number of successive cycles in which agreement of the signals continues for a predetermined period of time.

9. A cross-connect apparatus according to claim 1, further comprising:
a serial/parallel converter for converting an n-bit optical serial signal that arrives from a respective one of the input paths to an optical parallel signal;
a first optoelectronic transducer for converting said optical parallel signal to an electrical parallel signal;
a first electro-optic transducer provided on the input side of a respective one of the working cross-connects, said working cross-connects being optical cross-connects;
a second optoelectronic transducer provided on the output side of the optical cross-connect;
a second electro-optic transducer for converting an n-bit electrical parallel signal, which is output from jth output terminals (j=1 to m) of the first to nth working cross-connects via the second optoelectronic transducer, to an optical parallel signal; and
a parallel/serial converter for converting the optical parallel signal output from the second electro-optic transducer to an optical serial signal and sending the optical serial signal to a jth output path;
wherein each of the logic circuits performs a logical operation based upon electrical signals.

* * * * *